US012481155B2

(12) United States Patent
Wang et al.

(10) Patent No.: US 12,481,155 B2
(45) Date of Patent: Nov. 25, 2025

(54) SUPPRESSION OF FIRST-ORDER DIFFRACTION IN A TWO-DIMENSIONAL GRATING OF AN OUTPUT COUPLER FOR A HEAD-MOUNTED DISPLAY

(71) Applicant: Meta Platforms Technologies, LLC, Menlo Park, CA (US)

(72) Inventors: Haiwen Wang, Stanford, CA (US); Yu Shi, Redmond, WA (US); Siddharth Buddhiraju, Redmond, WA (US); Hee Yoon Lee, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 773 days.

(21) Appl. No.: 17/693,187

(22) Filed: Mar. 11, 2022

(65) Prior Publication Data

US 2023/0288705 A1 Sep. 14, 2023

(51) Int. Cl.
*G02B 27/01* (2006.01)
*F21V 8/00* (2006.01)
*G02B 5/18* (2006.01)

(52) U.S. Cl.
CPC ....... *G02B 27/0172* (2013.01); *G02B 5/1842* (2013.01); *G02B 6/005* (2013.01)

(58) Field of Classification Search
None
See application file for complete search history.

(56) References Cited

U.S. PATENT DOCUMENTS 7,505,147 B1 3/2009 Chen et al.
2020/0209630 A1\* 7/2020 Schultz ............. G02B 27/0081

OTHER PUBLICATIONS

International Preliminary Report on Patentability for International Application No. PCT/US2023/014904, mailed Sep. 26, 2024, 9 pages.
International Search Report and Written Opinion for International Application No. PCT/US2023/014904, mailed Jul. 4, 2023, 10 pages.
Liao Y-Y., et al., "Evanescent Properties of Optical Diffraction from 2-Dimensional Hexagonal Photonic Crystals and Their Sensor Applications," Materials, vol. 11, No. 4, Apr. 3, 2018, 8 pages.

\* cited by examiner

*Primary Examiner* — Toan Ton
*Assistant Examiner* — Danell L Owens
(74) *Attorney, Agent, or Firm* — Greenberg Traurig, LLP

(57) ABSTRACT

An output grating for waveguide of a head-mounted display is configured to suppress the (1, 1) diffraction order of the output grating. The grating has a design of two or more materials having different refractive indices. The design is repeated periodically in a first dimension and repeated periodically in a second dimension, to form a two-dimensional pattern. A refractive index of the two-dimensional pattern is approximated by a two-dimensional Fourier series comprising a first coefficient of order (1, 0), a second coefficient of order (0, 1), and a third coefficient of order (1, 1). The third coefficient is less than half the first coefficient and less than half the second coefficient, such that light from the (1, 1) diffraction order of the grating is suppressed.

20 Claims, 14 Drawing Sheets
(8 of 14 Drawing Sheet(s) Filed in Color)

SUPPRESSION OF FIRST-ORDER DIFFRACTION IN A TWO-DIMENSIONAL GRATING OF AN OUTPUT COUPLER FOR A HEAD-MOUNTED DISPLAY

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a holographic grating. In some implementations, the artificial reality systems may employ eye-tracking subsystems that can track the user's eye (e.g., gaze direction) to modify or generate content based on the direction in which the user is looking, thereby providing a more immersive experience for the user. The eye-tracking subsystems may be implemented using various optical components, such as holographic optical elements.

SUMMARY

This disclosure relates generally to suppressing an order of a grating. More specifically, and without limitation, to suppressing the (1, 1) order of a two-dimensional output grating for a head-mounted display.

According to certain embodiments, a system used in a head-mounted display comprises a projector configured to emit light; a waveguide configured to guide light received from the projector; and/or a grating configured to couple light out of the waveguide, wherein: the grating comprises a design of two or more materials having different refractive indices; the design is repeated periodically in a first dimension and repeated periodically in a second dimension to form a two-dimensional pattern; a refractive index of the two-dimensional pattern is approximated by a two-dimensional Fourier series comprising a first coefficient of order (1, 0), a second coefficient of order (0, 1), and a third coefficient of order (1, 1); and/or the third coefficient is less than half the first coefficient and less than half the second coefficient, such that light from the (1, 1) diffraction order of the grating is suppressed. In some embodiments, the third coefficient is less than one-fifth the first coefficient and less than one-fifth the second coefficient; the design is spatially nonsymmetrical; the two or more materials have a permittivity ranging from 4 to 7; the design is formed in a layer having a thickness equal to or less than 300 nm; the grating comprises a substrate and a device layer; the two-dimensional pattern is formed in the device layer; different refractive indices of the two or more materials are a binary difference; at least one of the two or more materials has a varying refractive index; the two-dimensional Fourier series comprises a fourth coefficient of order (2, 1); the third coefficient is less than half fourth coefficient; the two-dimensional pattern is a first two-dimensional pattern; the two-dimensional Fourier series is a first two-dimensional Fourier series; the first two-dimensional pattern is formed in a first layer; the grating comprises a second two-dimensional pattern formed in a second layer; the second two-dimensional pattern is approximated by a second two-dimensional Fourier series; a coefficient of the second two-dimensional Fourier series corresponding to a (1, 1) diffraction order is less than half a coefficient of the second two-dimensional Fourier series corresponding to a (1, 0) diffraction order and less than half a coefficient of the second two-dimensional Fourier Series corresponding to a (0, 1) diffraction order; the first layer is adjacent to the second layer; and/or a combined thickness of the first layer and the second layer is equal to or less than 300 nm.

According to some embodiments, a method comprises selecting an initial permittivity distribution, wherein the initial permittivity distribution comprises a design of two or more refractive index values repeated periodically in two dimensions; calculating Fourier coefficients to approximate the initial permittivity distribution; varying geometric parameters to reduce a specified Fourier coefficient to generate a two-dimensional pattern; and/or forming the two-dimensional pattern in a device layer of a wafer to form a grating in the device layer. In some embodiments, the specified Fourier coefficient corresponds with the (1, 1) order of the grating the specified Fourier coefficient is less than half a coefficient corresponding to a (1, 0) order and less than half a coefficient corresponding to the (0, 1) order; the two or more refractive index values are binary values; and/or the design is formed in a layer having a thickness equal to or less than 300 nm.

According to certain embodiments, a grating comprises a substrate and a device layer. The device layer comprises a design of two or more materials having different refractive indices; the design is repeated periodically in a first dimension and repeated periodically in a second dimension to form a two-dimensional pattern; a refractive index of the two-dimensional pattern is approximated by a two-dimensional Fourier series comprising a first coefficient of order (0, 1), a second coefficient of order (1, 1), and a third coefficient of order (2, 1); and/or the second coefficient is less than half the first coefficient and less than half the third coefficient. In some embodiments, the grating is part of a head-mounted display of an augmented-reality system; the design is formed in a layer having a thickness equal to or less than 300 nm; and/or different refractive indices of the two or more materials are a binary difference.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments are described with reference to the following figures.

Figure 1:
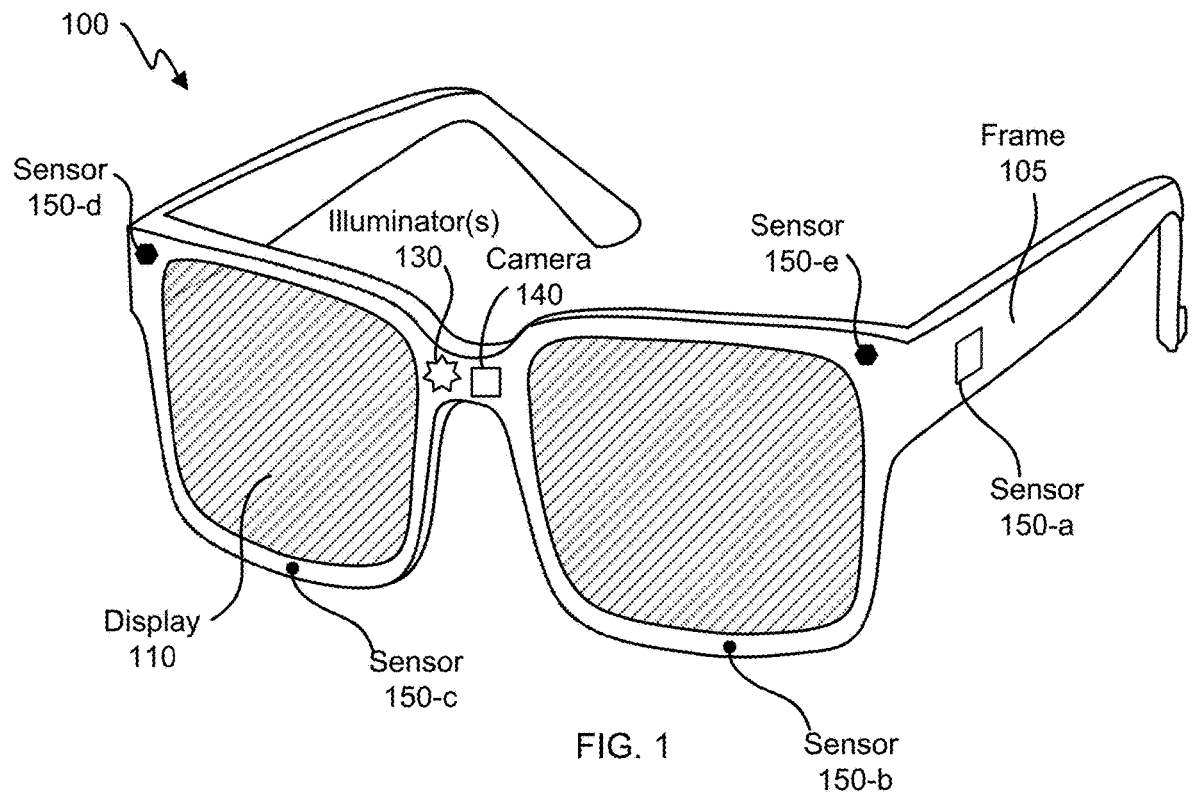
FIG. 1 is a perspective view of an embodiment of a near-eye display system in the form of a pair of glasses.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Techniques disclosed herein relate generally to an output grating of a waveguide display for a head-mounted display. More specifically, and without limitation, this disclosure relates to suppressing the (1, 1) order diffraction from a two-dimensional grating.

Many augmented-reality waveguides use two, one-dimensional gratings, clocked at a specific angle, to out couple light from a waveguide toward an eyebox of a near-eye display. Using one, two-dimensional output grating has several possible advantages over using two, one-dimensional gratings. Possible advantages include, but are not limited to, less processing steps to manufacture (e.g., etching one grating instead of two); greater capability to efficiently tune the grating (e.g., no longer limited to linear shapes); better display resolution and contrast; less grating conspicuity (e.g., of overlap regions and boundaries); and/or not having to align a front-side lithography process with a back-side lithography process.

Though using one, two-dimensional grating has several advantages over using two, one-dimensional gratings, a line of bright spots is observed using the two-dimensional grating, which is detrimental to the quality of the near-eye display.

This application describes techniques for suppressing the line of bright spots in a two-dimensional grating. The line of bright spots is a result of a direct output channel of the grating, of diffraction order (1, 1). The diffraction order (1, 1) can be suppressed by reducing, or minimizing, the (1, 1) Fourier component of a two-dimensional function of the grating's refractive index. By reducing the (1, 1) diffraction order of the two-dimensional grating, the quality of the two-dimensional grating is increased, enabling a two-dimensional grating to be used as an output coupler for a waveguide in the near-eye display.

A. Near-Eye Display

As used herein, visible light may refer to light with a wavelength between about 380 nm and about 750 nm, between about 400 nm and about 700 nm, or between about 440 nm and about 650 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a perspective view of an embodiment of a near-eye display 100. The near-eye display 100 is in the form of a pair of glasses. The near-eye display is configured to present media to a user. Examples of media presented by the near-eye display 100 include one or more images, video, and/or audio (e.g., speakers integrated with the near-eye display 100. In some embodiments, audio is presented via an external device (e.g., speakers and/or headphones) that receives audio information from the near-eye display 100, a console, or both, and presents audio data based on the audio information. The near-eye display 100 may be configured to operate as a virtual reality display, an augmented reality display, and/or a mixed reality display.

The near-eye display 100 includes a frame 105 and a display 110. The frame 105 is coupled with one or more optical elements, such as the display 110. The display 110 is configured to display content to a user. In some embodiments, the display 110 may include display electronics and/or display optics. In some embodiments, the display 110 comprises a waveguide display assembly for directing light of one or more images to an eye of the user.

The near-eye display 100 may further include various sensors 150-a, 150-b, 150-c, 150-d, and 150-e on or within frame 105. In some embodiments, sensors 150 may include one or more depth sensors, motion sensors, position sensors, inertial sensors, or ambient light sensors. In some embodiments, sensors 150 may include one or more image sensors configured to generate image data representing different fields of views in different directions. In some embodiments, sensors 150 may be used as input devices to control or influence the displayed content of near-eye display 100, and/or to provide an interactive VR/AR/MR experience to a user of near-eye display 100. In some embodiments, sensors 150 may also be used for stereoscopic imaging.

In some embodiments, the near-eye display 100 may further include one or more illuminators 130 to project light into the physical environment. The projected light may be associated with different frequency bands (e.g., visible light, infra-red light, ultra-violet light, etc.), and may serve various purposes. For example, illuminator(s) 130 may project light in a dark environment (or in an environment with low intensity of infra-red light, ultra-violet light, etc.) to assist sensors 150 in capturing images of different objects within the dark environment. In some embodiments, illuminator(s) 130 may be used to project certain light pattern onto the objects within the environment. In some embodiments, illuminator(s) 130 may be used as locators.

In some embodiments, the near-eye display 100 may also include a camera 140 (e.g., a high-resolution camera). Camera 140 may capture images of the physical environment in the field of view. The captured images may be processed, for example, by a virtual reality engine, to add virtual objects to the captured images or modify physical objects in the captured images, and the processed images may be displayed to the user by display 110 for VR, AR, or MR applications.

Figure 2:
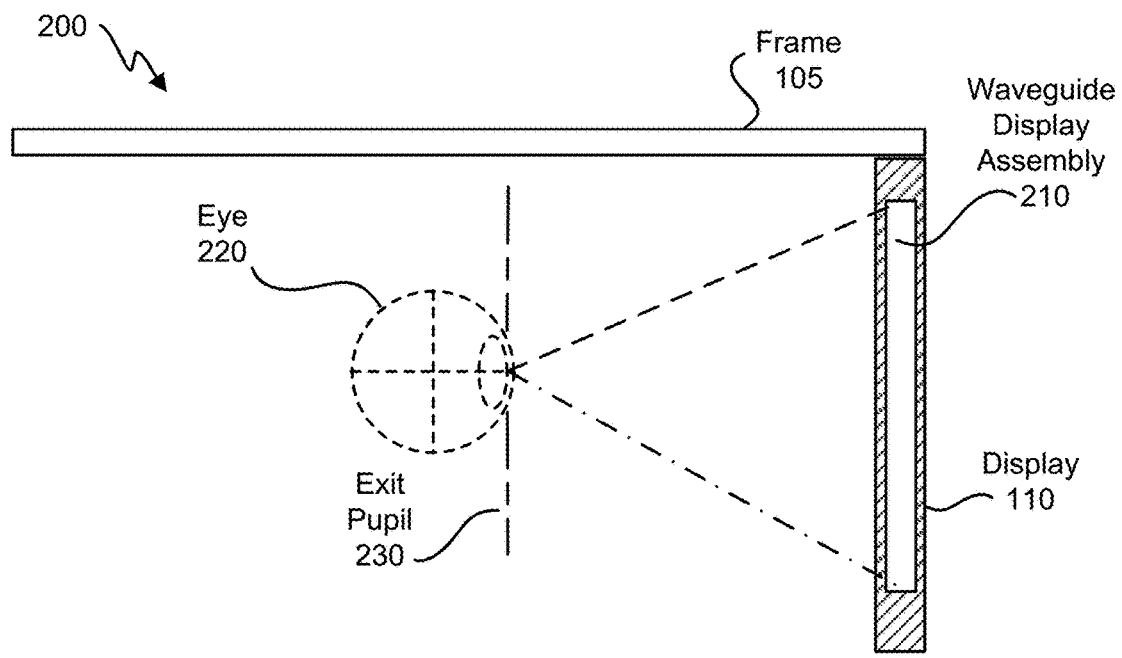
FIG. 2 is an embodiment of a cross section of the near-eye display.

FIG. 2 is an embodiment of a cross section 200 of the near-eye display 100 illustrated in FIG. 1. The display 110 comprises a waveguide display assembly 210. An exit pupil 230 is a location where the eye 220 is positioned in an eyebox region when the user wears the near-eye display 100. For purposes of illustration, FIG. 2 shows the cross section 200 associated with a single eye 220, and a single waveguide display assembly 210, but a second waveguide display is used for a second eye of a user.

The waveguide display assembly 210 is configured to direct image light to an eyebox located at the exit pupil 230, and thus to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not limited to, a stacked waveguide display, a varifocal waveguide display, etc. The stacked waveguide display can be a polychromatic display (e.g., a red-green-blue (RGB) display) created by stacking waveguide displays whose respective monochromatic sources are of different colors. The stacked waveguide display can also be a polychromatic display that can be projected on multiple planes (e.g. a multi-planar colored display). In some configurations, the stacked waveguide display is a monochromatic display that can be projected on multiple planes (e.g. multi-planar monochromatic display). The varifocal waveguide display can be a display that can adjust a focal position of image light emitted from the waveguide display assembly 210. In some embodiments, the waveguide display assembly 210 may include the stacked waveguide display and the varifocal waveguide display.

Figure 3:
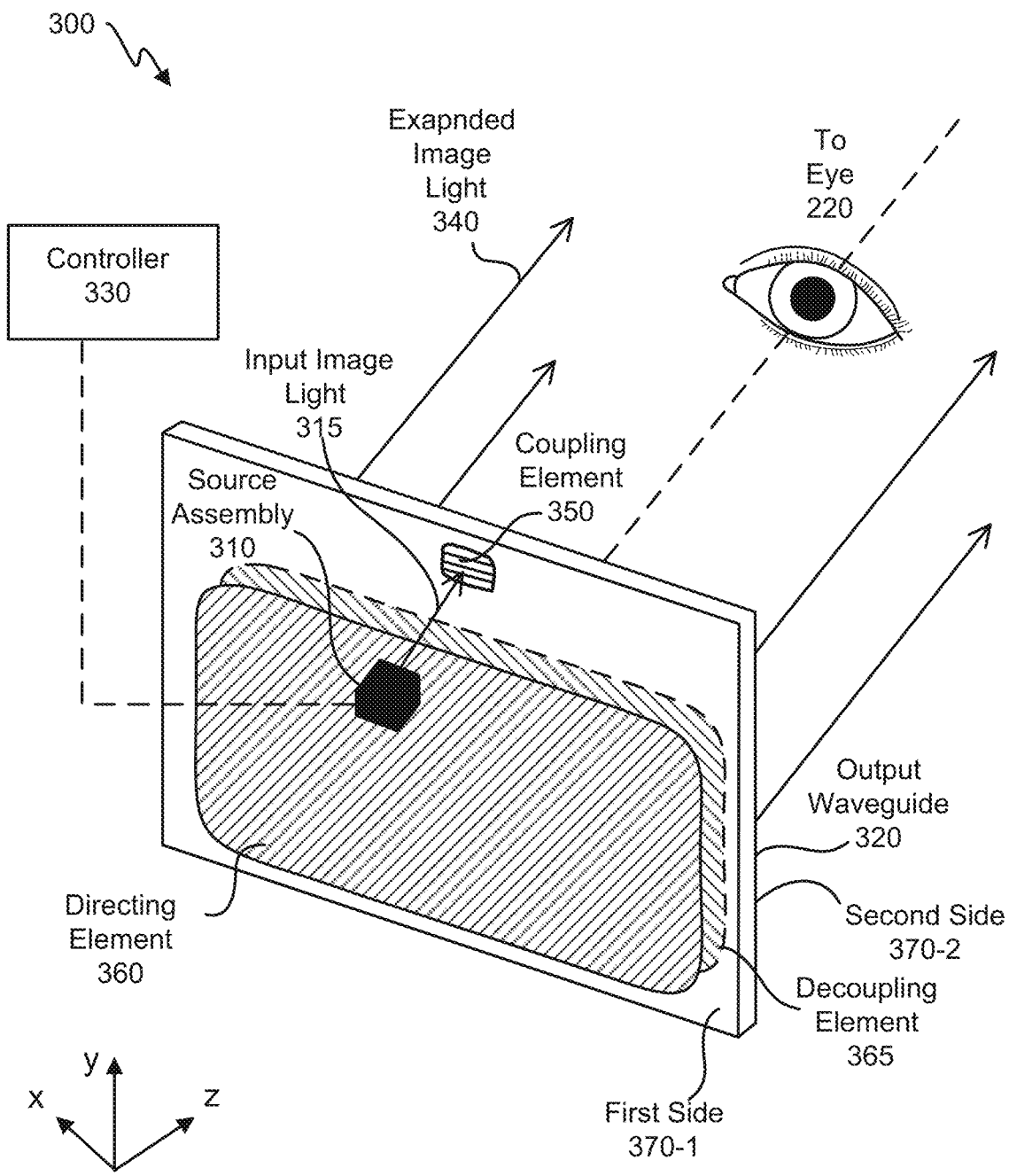
FIG. 3 illustrates an isometric view of an embodiment of a waveguide display with a single source assembly.

FIG. 3 illustrates an isometric view of an embodiment of a waveguide display 300. In some embodiments, the waveguide display 300 is a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

The source assembly 310 generates input image light 315. The source assembly 310 generates and outputs the input image light 315 to a coupling element 350 located on a first side 370-1 of the output waveguide 320. The output waveguide 320 is an optical waveguide that outputs expanded image light 340 to an eye 220 of a user. The output waveguide 320 receives the input image light 315 at one or more coupling elements 350 located on the first side 370-1 and/or on the second side 370-2 and guides the input image light 315 to a directing element 360. In some embodiments, the coupling element 350 couples the input image light 315 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received input image light 315 to the decoupling element 365 such that the received input image light 315 is decoupled out of the output waveguide 320 via the decoupling element 365. The directing element 360 is part of, or affixed to, the first side 370-1 of the output waveguide 320. The decoupling element 365 is part of, or affixed to, the second side 370-2 of the output waveguide 320. In some configurations, the decoupling element 365 is part of, or affixed to, the first side 370-1. The directing element 360 and/or the decoupling element 365 may be, e.g., a diffraction grating, a holographic grating, one or more cascaded reflectors, one or more prismatic surface elements, and/or an array of holographic reflectors. In FIG. 3, the directing element 360 and the decoupling element 365 are shown as one-dimensional gratings clocked at a predetermined angle. In some configurations, the decoupling element 365 is a two-dimensional grating and/or the directing element 360 is not present.

The second side 370-2 represents a plane along an x-dimension and a y-dimension. The output waveguide 320 may be composed of one or more materials that facilitate total internal reflection of the input image light 315. The output waveguide 320 may be composed of e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. In some embodiments, the output waveguide 320 outputs expanded image light 340 to the user's eye 220 with a field of view (FOV). In some configurations, the expanded image light 340 provided to the user's eye 220 has a diagonal FOV (in x and y) of 60 degrees or greater and/or 150 degrees or less. The output waveguide 320, in some configurations, is configured to provide an eyebox with a length equal to or greater than 20 mm and/or equal to or less than 50 mm; and/or a width equal to or greater than 10 mm or greater and/or equal to or less than 50 mm.

Figure 4:
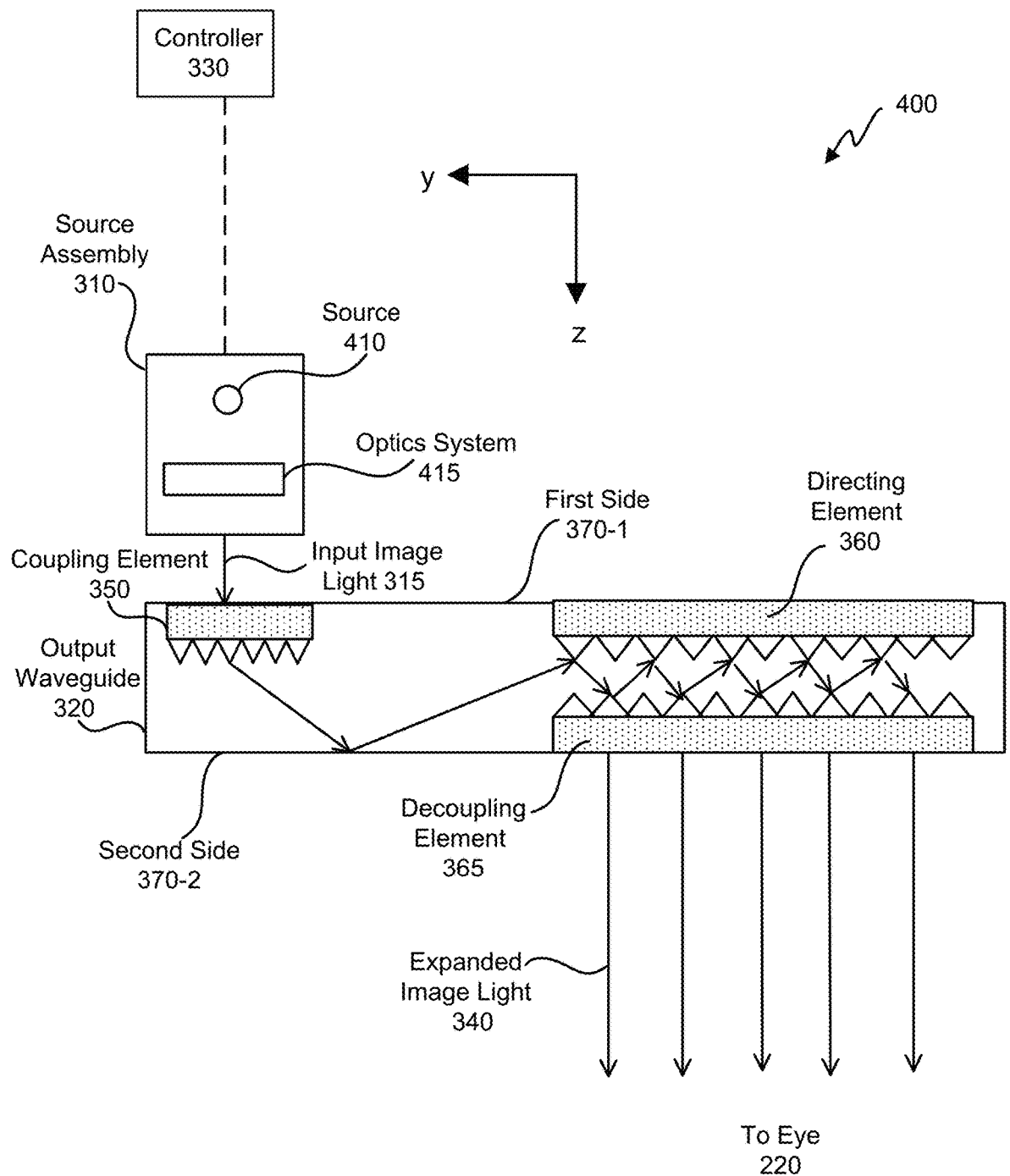
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates the input image light 315 in accordance with scanning instructions from the controller 330. The source assembly 310 includes a source 410 and an optics system 415. The source 410 is a light source that generates coherent, partially coherent, or non-coherent light. The source 410 may be, e.g., a laser diode, a vertical cavity surface emitting laser, and/or a light-emitting diode.

The optics system 415 includes one or more optical components that condition the light from the source 410. Conditioning light from the source 410 may include, e.g., expanding, polarizing, rotating polarization, collimating, and/or adjusting orientation. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens (e.g., based on inputs from the controller 330). Light emitted from the optics system 415 (and also the source assembly 310) is referred to as input image light 315.

The output waveguide 320 receives the input image light 315. The coupling element 350 couples the input image light 315 from the source assembly 310 into the output waveguide 320. In embodiments where the coupling element 350 is diffraction grating, a pitch of the diffraction grating is chosen such that total internal reflection occurs in the output waveguide 320, and the input image light 315 propagates internally in the output waveguide 320 (e.g., by total internal reflection), toward the decoupling element 365.

The directing element 360 (for configurations having a directing element) redirects the input image light 315 toward the decoupling element 365 for decoupling from the output waveguide 320. In embodiments where the directing element 360 is a diffraction grating, the pitch of the diffraction grating is chosen to cause input image light 315 to exit the output waveguide 320 at angle(s) of inclination relative to a surface of the decoupling element 365.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 may emit a monochromatic image light of a specific band of wavelength corresponding to a primary color (e.g., red, green, or blue). Each of the output waveguides 320 may be stacked together with a distance of separation to output an expanded image light 340 that is multi-colored.

Figure 5:
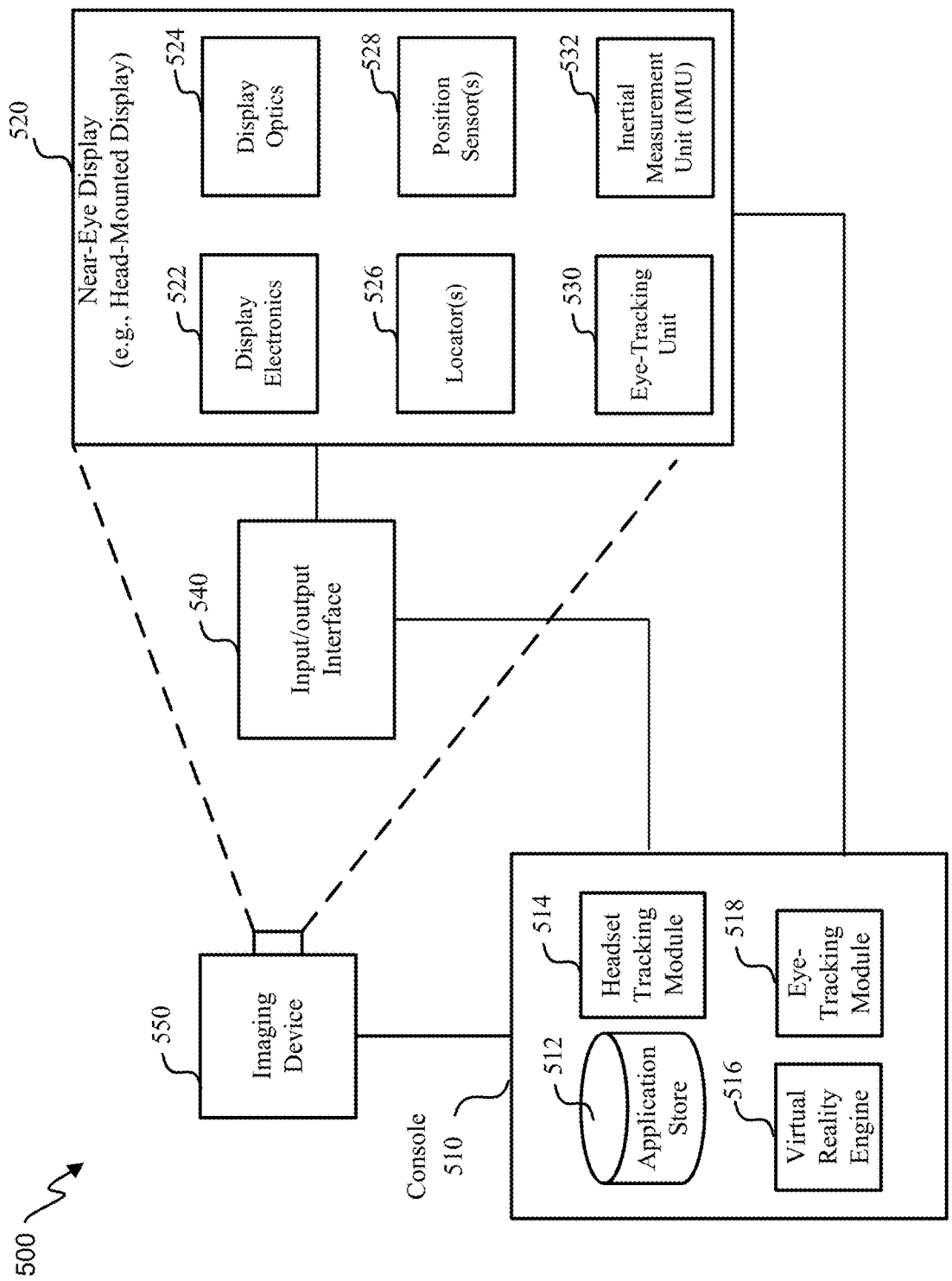
FIG. 5 is a simplified block diagram of an embodiment of an artificial reality system environment including a near-eye display system.

FIG. 5 is a simplified block diagram of an embodiment of an artificial reality system environment 500 including a near-eye display system 520. Artificial reality system environment 500 shown in FIG. 5 may include near-eye display system 520, an optional imaging device 550, and an optional input/output interface 540 that may each be coupled to an optional console 510. While FIG. 5 shows example artificial reality system environment 500 including one near-eye display system 520, one imaging device 550, and one input/output interface 540, some number of these components may be included in artificial reality system environment 500, or some of the components may be omitted. For example, there may be multiple near-eye display systems 520 monitored by one or more external imaging devices 550 in communication with console 510. In some configurations, artificial reality system environment 500 may not include imaging device 550, optional input/output interface 540, and optional console 510. In alternative configurations, different or additional components may be included in artificial reality system environment 500. In some configurations, near-eye display systems 520 may include imaging device 550, which may be used to track one or more input/output devices (e.g., input/output interface 540), such as a handhold controller.

Near-eye display system 520 may be a head-mounted display that presents content to a user. Examples of content presented by near-eye display system 520 include one or more of images, videos, audios, or some combination thereof. In some embodiments, audios may be presented via an external device (e.g., speakers and/or headphones) that receives audio information from near-eye display system 520, console 510, or both, and presents audio data based on the audio information. Near-eye display system 520 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 520 may be implemented in a suitable form factor, including a pair of glasses. Some embodiments of near-eye display system 520 are further described below. Additionally, in various embodiments, the functionality described herein may be used in a headset that combines images of an environment external to near-eye display system 520 and artificial reality content (e.g., computer-generated images). Therefore, near-eye display system 520 may augment images of a physical, real-world environment external to near-eye display system 520 with generated content (e.g., images, video, sound, etc.) to present an augmented reality to a user.

In various embodiments, near-eye display system 520 may include one or more of display electronics 522, display optics 524, and an eye-tracking system 530. In some embodiments, near-eye display system 520 may also include one or more locators 526, one or more position sensors 528, and an inertial measurement unit (IMU) 532. Near-eye display system 520 may omit some of these elements or include additional elements in various embodiments. Additionally, in some embodiments, near-eye display system 520 may include elements combining the function of various elements described.

Display electronics 522 may display or facilitate the display of images to the user according to data received from, for example, console 510. In various embodiments, display electronics 522 may include one or more display panels, such as a liquid crystal display (LCD), an organic light emitting diode (OLED) display, an inorganic light emitting diode (ILED) display, a micro light emitting diode (□LED) display, an active-matrix OLED display (AMOLED), a transparent OLED display (TOLED), or some other display. For example, in one implementation of near-eye display system 520, display electronics 522 may include a front TOLED panel, a rear display panel, and an optical component (e.g., an attenuator, polarizer, or diffractive or spectral film) between the front and rear display panels. Display electronics 522 may include pixels to emit light of a predominant color such as red, green, blue, white, or yellow. In some implementations, display electronics 522 may display a three-dimensional (3D) image through stereo effects produced by two-dimensional panels to create a subjective perception of image depth. For example, display electronics 522 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 524 may display image content optically (e.g., using optical waveguides and couplers), magnify image light received from display electronics 522, correct optical errors associated with the image light, and present the corrected image light to a user of near-eye display system 520. In various embodiments, display optics 524 may include one or more optical elements, such as, for example, a substrate, optical waveguides, an aperture, a Fresnel lens, a convex lens, a concave lens, a filter, input/output couplers, or some other suitable optical elements that may affect image light emitted from display electronics 522. Display optics 524 may include a combination of different optical elements as well as mechanical couplings to maintain relative spacing and orientation of the optical elements in the combination. One or more optical elements in display optics 524 may have an optical coating, such as an anti-reflective coating, a reflective coating, a filtering coating, or a combination of different optical coatings.

Magnification of the image light by display optics 524 may allow display electronics 522 to be physically smaller, weigh less, and consume less power than larger displays. Additionally, magnification may increase a field of view of the displayed content. The amount of magnification of image light by display optics 524 may be changed by adjusting, adding, or removing optical elements from display optics 524. In some embodiments, display optics 524 may project displayed images to one or more image planes that may be further away from the user's eyes than near-eye display system 520.

Display optics 524 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 526 may be objects located in specific positions on near-eye display system 520 relative to one another and relative to a reference point on near-eye display system 520. In some implementations, console 510 may identify locators 526 in images captured by imaging device 550 to determine the artificial reality headset's position, orientation, or both. A locator 526 may be a light emitting diode (LED), a corner cube reflector, a reflective marker, a type of light source that contrasts with an environment in which near-eye display system 520 operates, or some combinations thereof. In embodiments where locators 526 are active components (e.g., LEDs or other types of light emitting devices), locators 526 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in a combination of portions of the electromagnetic spectrum.

Imaging device 550 may be part of near-eye display system 520 or may be external to near-eye display system 520. Imaging device 550 may generate slow calibration data based on calibration parameters received from console 510. Slow calibration data may include one or more images showing observed positions of locators 526 that are detectable by imaging device 550. Imaging device 550 may include one or more cameras, one or more video cameras, other device capable of capturing images including one or more of locators 526, or some combinations thereof. Additionally, imaging device 550 may include one or more filters (e.g., to increase signal to noise ratio). Imaging device 550 may be configured to detect light emitted or reflected from locators 526 in a field of view of imaging device 550. In embodiments where locators 526 include passive elements (e.g., retroreflectors), imaging device 550 may include a light source that illuminates some or all of locators 526, which may retro-reflect the light to the light source in imaging device 550. Slow calibration data may be communicated from imaging device 550 to console 510, and imaging device 550 may receive one or more calibration parameters from console 510 to adjust one or more imaging parameters (e.g., focal length, focus, frame rate, sensor temperature, shutter speed, aperture, etc.).

Position sensors 528 may generate one or more measurement signals in response to motion of near-eye display system 520. Examples of position sensors 528 may include accelerometers, gyroscopes, magnetometers, other motion-detecting or error-correcting sensors, or some combinations thereof. For example, in some embodiments, position sensors 528 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 532 may be an electronic device that generates fast calibration data based on measurement signals received from one or more of position sensors 528. Position sensors 528 may be located external to IMU 532, internal to IMU 532, or some combination thereof. Based on the one or more measurement signals from one or more position sensors 528, IMU 532 may generate fast calibration data indicating an estimated position of near-eye display system 520 relative to an initial position of near-eye display system 520. For example, IMU 532 may integrate measurement signals received from accelerometers over time to estimate a velocity vector and integrate the velocity vector over time to determine an estimated position of a reference point on near-eye display system 520. Alternatively, IMU 532 may provide the sampled measurement signals to console 510, which may determine the fast calibration data. While the reference point may generally be defined as a point in space, in various embodiments, the reference point may also be defined as a point within near-eye display system 520 (e.g., a center of IMU 532).

Eye-tracking system 530 may include one or more eye-tracking systems. Eye tracking may refer to determining an eye's position, including orientation and location of the eye, relative to near-eye display system 520. An eye-tracking system may include an imaging system to image one or more eyes and may generally include a light emitter, which may generate light that is directed to an eye such that light reflected by the eye may be captured by the imaging system. For example, eye-tracking system 530 may include a non-coherent or coherent light source (e.g., a laser diode) emitting light in the visible spectrum or infrared spectrum, and a camera capturing the light reflected by the user's eye. As another example, eye-tracking system 530 may capture reflected radio waves emitted by a miniature radar unit. Eye-tracking system 530 may use low-power light emitters that emit light at frequencies and intensities that would not injure the eye or cause physical discomfort. Eye-tracking system 530 may be arranged to increase contrast in images of an eye captured by eye-tracking system 530 while reducing the overall power consumed by eye-tracking system 530 (e.g., reducing power consumed by a light emitter and an imaging system included in eye-tracking system 530). For example, in some implementations, eye-tracking system 530 may consume less than 100 milliwatts of power.

In some embodiments, eye-tracking system 530 may include one light emitter and one camera to track each of the user's eyes. Eye-tracking system 530 may also include different eye-tracking systems that operate together to provide improved eye tracking accuracy and responsiveness. For example, eye-tracking system 530 may include a fast eye-tracking system with a fast response time and a slow eye-tracking system with a slower response time. The fast eye-tracking system may frequently measure an eye to capture data used by an eye-tracking module 518 to determine the eye's position relative to a reference eye position. The slow eye-tracking system may independently measure the eye to capture data used by eye-tracking module 518 to determine the reference eye position without reference to a previously determined eye position. Data captured by the slow eye-tracking system may allow eye-tracking module 518 to determine the reference eye position with greater accuracy than the eye's position determined from data captured by the fast eye-tracking system. In various embodiments, the slow eye-tracking system may provide eye-tracking data to eye-tracking module 518 at a lower frequency than the fast eye-tracking system. For example, the slow eye-tracking system may operate less frequently or have a slower response time to conserve power.

Eye-tracking system 530 may be configured to estimate the orientation of the user's eye. The orientation of the eye may correspond to the direction of the user's gaze within near-eye display system 520. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 530 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 520 on a user's head, may also be detected. Eye-tracking system 530 may also detect the torsion of the eye and the rotation of the eye about the pupillary axis. Eye-tracking system 530 may use the detected torsion of the eye to estimate the orientation of the foveal axis from the pupillary axis. In some embodiments, eye-tracking system 530 may also track a change in the shape of the eye, which may be approximated as a skew or scaling linear transform or a twisting distortion (e.g., due to torsional deformation). In some embodiments, eye-tracking system 530 may estimate the foveal axis based on some combinations of the angular orientation of the pupillary axis, the translation of the eye, the torsion of the eye, and the current shape of the eye.

In some embodiments, eye-tracking system 530 may include multiple emitters or at least one emitter that can project a structured light pattern on all portions or a portion of the eye. The structured light pattern may be distorted due to the shape of the eye when viewed from an offset angle. Eye-tracking system 530 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 530 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 530 can also estimate the pupillary axis, the translation of the eye, the torsion of the eye, and the current shape of the eye based on the image of the distorted structured light pattern captured by the camera.

Near-eye display system 520 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on a particular subject, object, and/or frame as a function of exposed stimuli), some other functions that are based in part on the orientation of at least one of the user's eyes, or some combination thereof. Because the orientation may be determined for both eyes of the user, eye-tracking system 530 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 540 may be a device that allows a user to send action requests to console 510. An action request may be a request to perform a particular action. For example, an action request may be to start or to end an application or to perform a particular action within the application. Input/output interface 540 may include one or more input devices. Example input devices may include a keyboard, a mouse, a game controller, a glove, a button, a touch screen, or other suitable device for receiving action requests and communicating the received action requests to console 510. An action request received by the input/output interface 540 may be communicated to console 510, which may perform an action corresponding to the requested action. In some embodiments, input/output interface 540 may provide haptic feedback to the user in accordance with instructions received from console 510. For example, input/output interface 540 may provide haptic feedback when an action request is received, or when console 510 has performed a requested action and communicates instructions to input/output interface 540. In some embodiments, imaging device 550 may be used to track input/output interface 540, such as tracking the location or position of a controller (which may include, for example, an IR light source) or a hand of the user to determine the motion of the user. In some embodiments, near-eye display system 520 may include one or more imaging devices (e.g., imaging device 550) to track input/output interface 540, such as tracking the location or position of a controller or a hand of the user to determine the motion of the user.

Console 510 may provide content to near-eye display system 520 for presentation to the user in accordance with information received from one or more of imaging device 550, near-eye display system 520, and input/output interface 540. In the example shown in FIG. 5, console 510 may include an application store 512, a headset tracking module 514, an artificial reality engine 516, and eye-tracking module 518. Some embodiments of console 510 may include different or additional modules than those described. Functions further described below may be distributed among components of console 510 in a different manner than is described here.

In some embodiments, console 510 may include a processor and a non-transitory computer-readable storage medium storing instructions executable by the processor. The processor may include multiple processing units executing instructions in parallel. The computer-readable storage medium may be a memory device, such as a hard disk drive, a removable memory, or a solid-state drive (e.g., flash memory or dynamic random access memory (DRAM)). In various embodiments, the modules of console 510 described may be encoded as instructions in the non-transitory computer-readable storage medium that, when executed by the processor, cause the processor to perform the functions further described below.

Application store 512 may store one or more applications for execution by console 510. An application may include a group of instructions that, when executed by a processor, generates content for presentation to the user. Content generated by an application may be in response to inputs received from the user via movement of the user's eyes or inputs received from the input/output interface 540. Examples of the applications may include gaming applications, conferencing applications, video playback application, or other suitable applications.

Headset tracking module 514 may track movements of near-eye display system 520 using slow calibration information from imaging device 550. For example, headset tracking module 514 may determine positions of a reference point of near-eye display system 520 using observed locators from the slow calibration information and a model of near-eye display system 520. Headset tracking module 514 may also determine positions of a reference point of near-eye display system 520 using position information from the fast calibration information. Additionally, in some embodiments, headset tracking module 514 may use portions of the fast calibration information, the slow calibration information, or some combination thereof, to predict a future location of near-eye display system 520. Headset tracking module 514 may provide the estimated or predicted future position of near-eye display system 520 to artificial reality engine 516.

Headset tracking module 514 may calibrate the artificial reality system environment 500 using one or more calibration parameters, and may adjust one or more calibration parameters to reduce errors in determining the position of near-eye display system 520. For example, headset tracking module 514 may adjust the focus of imaging device 550 to obtain a more accurate position for observed locators on near-eye display system 520. Moreover, calibration performed by headset tracking module 514 may also account for information received from IMU 532. Additionally, if tracking of near-eye display system 520 is lost (e.g., imaging device 550 loses line of sight of at least a threshold number of locators 526), headset tracking module 514 may re-calibrate some or all of the calibration parameters.

Artificial reality engine 516 may execute applications within artificial reality system environment 500 and receive position information of near-eye display system 520, acceleration information of near-eye display system 520, velocity information of near-eye display system 520, predicted future positions of near-eye display system 520, or some combination thereof from headset tracking module 514. Artificial reality engine 516 may also receive estimated eye position and orientation information from eye-tracking module 518. Based on the received information, artificial reality engine 516 may determine content to provide to near-eye display system 520 for presentation to the user. For example, if the received information indicates that the user has looked to the left, artificial reality engine 516 may generate content for near-eye display system 520 that reflects the user's eye movement in a virtual environment. Additionally, artificial reality engine 516 may perform an action within an application executing on console 510 in response to an action request received from input/output interface 540, and provide feedback to the user indicating that the action has been performed. The feedback may be visual or audible feedback via near-eye display system 520 or haptic feedback via input/output interface 540.

Eye-tracking module 518 may receive eye-tracking data from eye-tracking system 530 and determine the position of the user's eye based on the eye-tracking data. The position of the eye may include an eye's orientation, location, or both relative to near-eye display system 520 or element thereof. Because the eye's axes of rotation change as a function of the eye's location in its socket, determining the eye's location in its socket may allow eye-tracking module 518 to more accurately determine the eye's orientation.

In some embodiments, eye-tracking module 518 may store a mapping between images captured by eye-tracking system 530 and eye positions to determine a reference eye position from an image captured by eye-tracking system 530. Alternatively or additionally, eye-tracking module 518 may determine an updated eye position relative to a reference eye position by comparing an image from which the reference eye position is determined to an image from which the updated eye position is to be determined. Eye-tracking module 518 may determine eye position using measurements from different imaging devices or other sensors. For example, eye-tracking module 518 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 518 may also determine eye calibration parameters to improve precision and accuracy of eye tracking. Eye calibration parameters may include parameters that may change whenever a user dons or adjusts near-eye display system 520. Example eye calibration parameters may include an estimated distance between a component of eye-tracking system 530 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 520 may reach the eye (as in some augmented reality applications), the calibration parameters may include correction factors for intensity and color balance due to variations in light from the outside of near-eye display system 520. Eye-tracking module 518 may use eye calibration parameters to determine whether the measurements captured by eye-tracking system 530 would allow eye-tracking module 518 to determine an accurate eye position (also referred to herein as "valid measurements"). Invalid measurements, from which eye-tracking module 518 may not be able to determine an accurate eye position, may be caused by the user blinking, adjusting the headset, or removing the headset, and/or may be caused by near-eye display system 520 experiencing greater than a threshold change in illumination due to external light. In some embodiments, at least some of the functions of eye-tracking module 518 may be performed by eye-tracking system 530.

B. Two Dimensional Gratings

Many augmented-reality waveguides use two, one-dimensional gratings, clocked at a specific angle, to out couple light from a waveguide toward an eyebox of a near-eye display. Using one, two-dimensional output grating has several possible advantages over using two, one-dimensional gratings. Possible advantages include, but are not limited to, less processing steps to manufacture (e.g., etching one grating instead of two); greater capability to efficiently tune the grating (e.g., no longer limited to parallelogram feature shapes); higher display resolution and contrast; less grating conspicuity (e.g., of overlap regions and boundaries); and/or not having to align a front-side lithography process with a back-side lithography process. An example of a two-dimensional grating is given in U.S. application Ser. No. 15/968,576, filed on May 1, 2018, which is incorporated by reference for all purposes.

Figure 6:
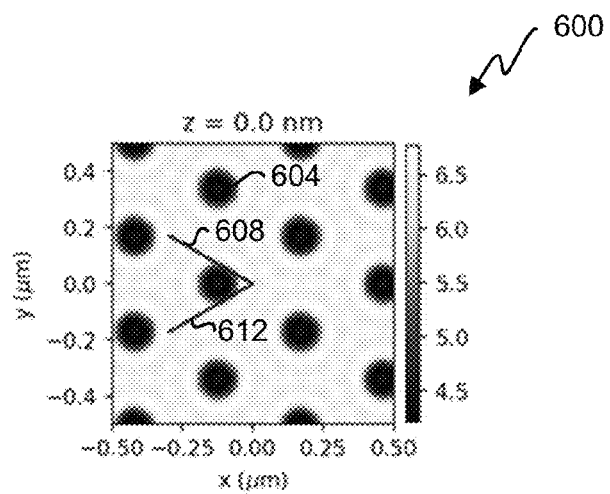
FIG. 6 is an embodiment of a two-dimensional pattern for a grating, wherein the two-dimensional pattern is not corrected to suppress (1, 1) reflective diffraction order.

FIG. 6 is an embodiment of a pattern 600 for a grating. The grating could be intended for an output coupler of a near-eye display. The pattern 600 is based on a design 604 that is repeated periodically in first dimension 608 and repeated periodically in a second dimension 612. The pattern 600 is a two-dimensional pattern of varying permittivity between 4 and 7. The pattern 600 is not corrected to suppress the (1, 1) diffraction order.

Figure 7:
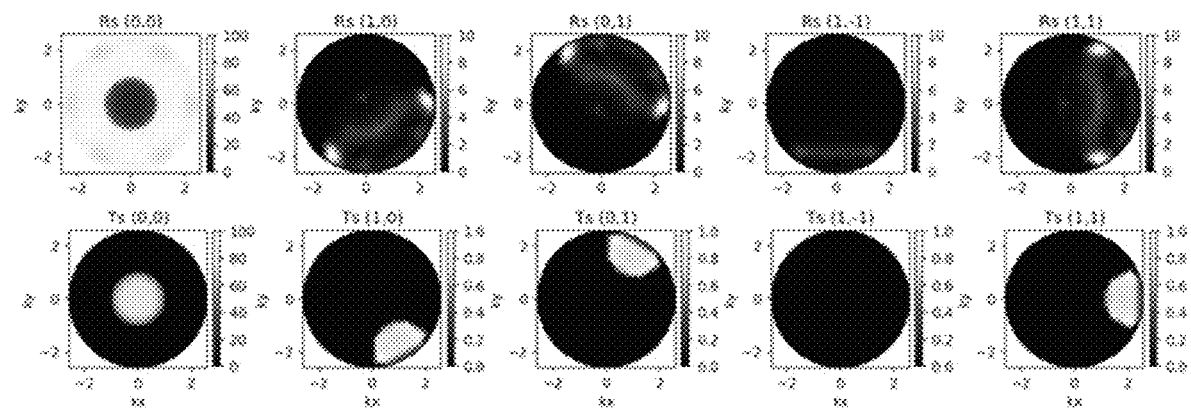
FIG. 7 depicts simulated diffraction and transmission plots for the embodiment of the two-dimensional pattern in FIG. 6.

FIG. 7 depicts simulated diffraction and transmission plots for the embodiment of the pattern 600 in FIG. 6. Reflection diffraction orders (0, 0), (1, 0), (0, 1), (1, −1), and (1, 1) for s-polarized light are shown and labeled as Rs. Transmission diffraction orders (0, 0), (1, 0), (0, 1), (1, −1), and (1, 1) for s-polarized light are shown and labeled as Ts. First-order diffraction (1, 1) has a diffraction efficiencies comparable to diffraction orders (1, 0) and (0, 1).

Figure 8:
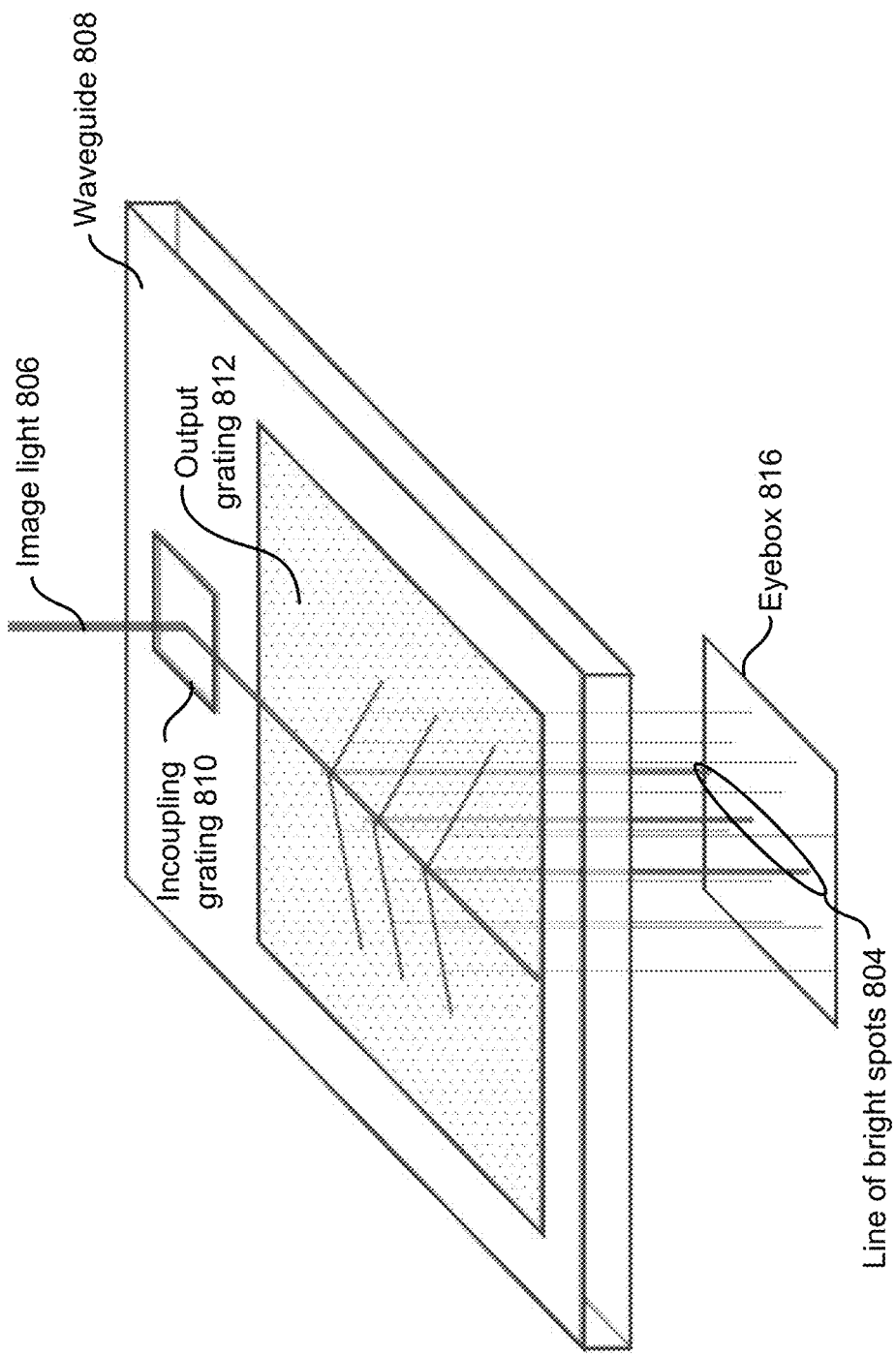
FIG. 8 is a sketch depicting a line of bright spots caused by (1, 1) order diffraction.

FIG. 8 is a sketch depicting a line of bright spots 804 caused by the (1, 1) diffraction order. Image light 806 is coupled into waveguide 808 by incoupling grating 810. Light from the waveguide 808 is coupled out of the waveguide 808 by an output grating 812 to an eyebox 816. When using a grating to in-couple and out-couple light from a waveguide, two-dimensional gratings offer more structural degrees of freedom compared to one-dimensional gratings. Though using one, two-dimensional grating has several advantages over using two, one-dimensional gratings, the line of bright spots 804 can be observed using a two-dimensional grating (e.g., similar to one formed by pattern 600 in FIG. 6), which is detrimental to the quality of the near-eye display. For this reason, most augmented-reality waveguides use two, one-dimensional periodic gratings instead of one, two-dimensional periodic gratings. The (1, 1) order allows for a direct out coupling channel, that leads to the line of bright spots 804.

Since the (1, 1) order results in the line of bright spots 804, it is desirable to suppress the (1, 1) order, thereby suppressing the line of bright spots in a two-dimensional grating. The (1, 1) diffraction order can be suppressed by reducing, or minimizing, the (1, 1) Fourier component of a two-dimensional function of the grating's refractive index. By reducing the (1, 1) diffraction order of the two-dimensional grating, the quality of the two-dimensional grating is increased, enabling a two-dimensional grating to be used as an output coupler for a waveguide in the near-eye display (e.g., the line of bright spots 804 is reduced or eliminated).

C. Minimizing Fourier Coefficients

By minimizing the (1, 1) Fourier component of a dielectric structure, the (1, 1) diffraction order can be suppressed.

Figure 9:
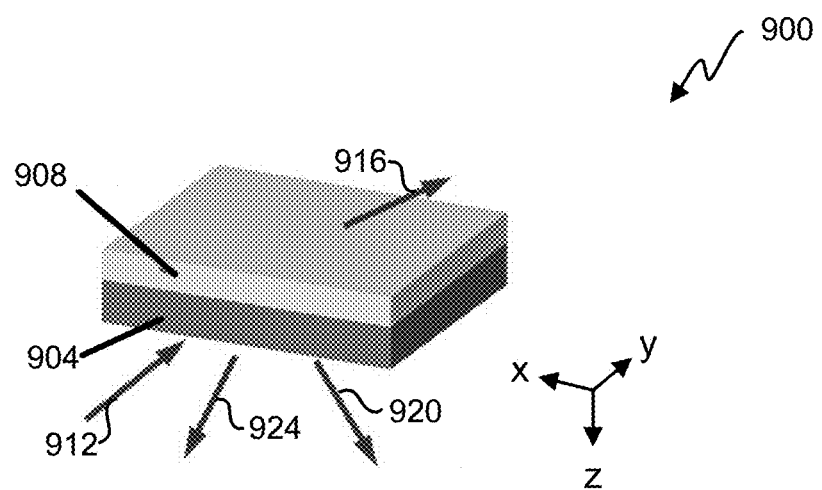
FIG. 9 depicts an embodiment of a grating transmitting and diffracting light.

FIG. 9 depicts an embodiment of a grating 900 diffracting light. The grating 900 comprises a substrate 904 and a device layer 908. A two-dimensional pattern is formed in the device layer 908. For example, two or more materials having two or more refractive index values are patterned in the device layer 908. In some embodiments, materials could be applied by ink jet. In some embodiments, lithographic techniques are used to create a pattern in the device layer 908. For example, an array of holes is etched in the device layer 908. In some embodiments, the device layer 908 has a thickness equal to or greater than 30, 50, 80, or 90 nm and/or equal to or less than 90, 100, 180, 200, or 300 nm. U.S. patent application Ser. No. 15/878,227, filed on Jan. 23, 2018, Ser. No. 15/878,230, filed on Jan. 23, 2018, Ser. No. 15/878,232, filed on Jan. 23, 2018, and Ser. No. 16/865,105, filed on May 1, 2020, the disclosures of which are incorporated by reference for all purposes, provide various techniques for making a grating with a varying refractive index.

Light 912 incident on the grating 900 is partially transmitted into a direct transmission channel 916, transmission order (0, 0), and into other transmission channels. Light 912 incident on the grating 900 is also partially refracted into a direct refraction channel 920, diffraction order (0, 0), and into other diffraction channels 924 (e.g., diffraction orders (1, 0), (0, 1), (1, 1), etc.). Since examples in this disclosure focuses on reflection, orders will refer to reflection orders and not transmission orders, unless specifically stated, though similar principles would apply for suppressing transmission orders.

In some embodiments, the grating 900 is used as the decoupling element 365 in FIG. 3, without the direction element 360. The decoupling element 365 can be on the first side 370-1 or the second side 370-2 of the output waveguide 320 in FIG. 4.

Figure 10:
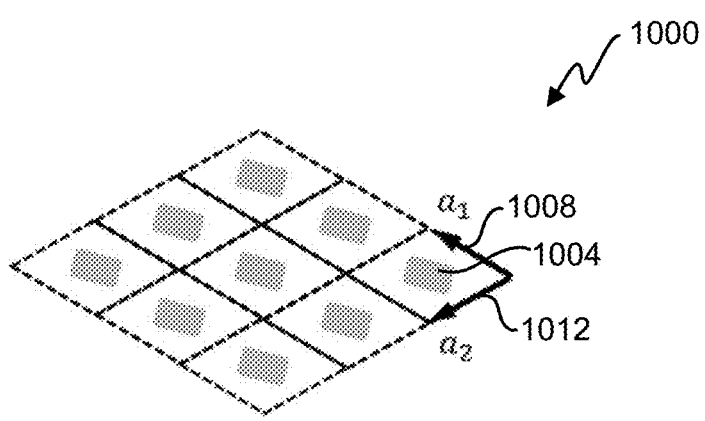
FIG. 10 depicts an embodiment of a periodic pattern in two dimensions.

FIG. 10 depicts an embodiment of a pattern 1000 for a grating. The pattern 1000 is based on a design 1000 that is repeated periodically in first dimension 1008 and repeated periodically in a second dimension 1012. For a pattern to be repeated periodically in a dimension, there is variation of permittivity (and thus refractive index) along that dimension. Further, the first dimension 1008 is not necessarily orthogonal to the second dimension 1012.

The pattern 1000 is a two-dimensional pattern of varying refractive index in the x/y plane. The pattern 1000 is a two-dimensional, periodic pattern. The permittivity (and thus the refractive index) of the pattern 1000 can approximated by a two-dimensional Fourier series. For example, Fourier coefficients can be calculated by Equation 1 and Equation 2 below.

$$f(x, y) = \sum_{m,n=-\infty}^{\infty} c_{mn} e^{j\pi\left(\frac{mx}{l}+\frac{ny}{h}\right)} \qquad \text{Equation 1}$$

$$c_{mn} = \frac{1}{2l2h} \int\int_R f(x, y) e^{-j\pi\left(\frac{mx}{l}+\frac{ny}{h}\right)} \qquad \text{Equation 2}$$

Where, $R\{-l \leq x \leq l, -h \leq y \leq h\}$, and m, n=0, ±1, ±2, ±3, . . .

By minimizing the Fourier coefficient, c(m, n), efficiency of diffraction order (m, n) is also minimized. Accordingly, the amplitude of c(1, 1) is strongly correlated to the efficiency of diffraction order (1, 1).

In some embodiments, the Fourier series for a non-orthogonal lattice is calculated by equation 6 as described in V. Liu & S. Fan, "S4: A free electromagnetic solver for layered periodic structures," Computer Physics Communications 183 (2012), available at: https://web.stanford.edu/group/fan/publication/Liu_ComputerPhysicsCommunications_183_223 3_2012.pdf (last accessed Mar. 7, 2022). For reference, the equation for a general lattice is given in Equation 3 below.

$$\epsilon_G = \frac{1}{|L_r|} \int_{cell} \epsilon(r) e^{-iG \cdot r} dr \qquad \text{Equation 3}$$

Figure 11:
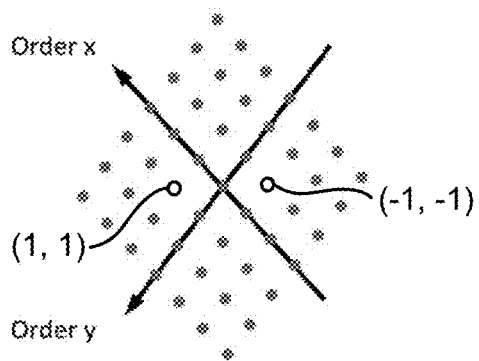
FIG. 11 shows a plot of Fourier coefficients of the periodic pattern in FIG. 10.

FIG. 11 shows a plot of Fourier coefficients of the x/y plane permittivity of pattern 1000 in FIG. 10. Each solid dot represents a nonzero value. Circles denote the c(1, 1) (and also c(−1, −1)), Fourier coefficients to be reduced or minimized. The pattern 1000 is modified to suppress first-order diffraction by reducing Fourier coefficients c(1, 1). Fourier coefficients are reduced by changing the permittivity of the periodic pattern.

In some embodiments, a system used in a head-mounted display (e.g., the near-eye display 100 in FIG. 1) comprises a projector (e.g., source assembly 310 in FIG. 3). The projector is configure to emit light (e.g., input image light 315). The head-mounted display comprises a waveguide (e.g., output waveguide 320 in FIG. 3) configured to guide light received from the projector. A grating (e.g., grating 900) is configured to couple light out of the waveguide. The grating comprises a design (e.g., design 1004 in FIG. 10, or a design explained later) of two or more materials having different refractive indices. The design is repeated periodically in a first dimension (e.g., first dimension 1008 in FIG. 10) and repeated periodically in a second dimension (e.g., second dimension 1012 in FIG. 10) to form a two-dimensional pattern (e.g., pattern 1000 in FIG. 10). The refractive index of the two-dimensional pattern is approximated by a two-dimensional Fourier series comprising a first coefficient of order (1, 0), a second coefficient of order (0, 1), and a linear combination of integer multiples of these two orders (such as the (1, 1), (2, 1), (1, −2) orders). To suppress the (1, 1) diffraction order, the grating's (1, 1) Fourier coefficient is suppressed. In some embodiments, the (1, 1) coefficient is less than ½, ⅕, or 1/10 the first coefficient and/or equal to or greater than 1/20, 1/50, 1/100, or 1/1000.

In some embodiments, a grating comprises a substrate and a device layer (e.g., as described in FIG. 9). The device layer comprises a design of two or more materials having different refractive indices. The design is repeated periodically in a first dimension and repeated periodically in a second dimension to form a two-dimensional pattern.

Though suppressing the (1, 1) order is described, similar techniques can be used to suppress other channels/orders (e.g., in addition to or in lieu of the (1, 1) order). Optimizing the Fourier coefficients of the permittivity distribution can be much faster compared with other E&M-based design techniques. Techniques disclosed herein can result in a large class of structures that suppresses a certain diffraction order (in this case the (1, 1) order), namely those with suppressed Fourier coefficients at that order. Further, though plots are shown for reflection with s-polarization, similar conclusions hold for p-polarization. Accordingly, techniques can be used to suppress diffraction towards most any diffraction channel. In some embodiments, techniques to suppress the (1, 1) diffraction order by suppressing the (1, 1) Fourier coefficient is applied to vertically extruded structures and/or slanted extruded structures (e.g., etching or nanoimprint). In some embodiments disclosed techniques are applied to slant structures used for grating in waveguides. In some embodiments, slant angles are added to the grating, which leads to asymmetric transmission/reflection, and redistributing energy between transmission/reflection channels.

When contrast of the grating is too high, suppression of the (1, 1) order is less pronounced. Also, when a thickness of the device layer of the grating is increased, suppression of the (1, 1) order is less pronounced. In some embodiments, index contrast in decreased and/or thickness of the grating is decreased for better suppression of the (1, 1) order.

Specific, non-limiting, examples for pattern 1000 in FIG. 10 are further provided below.

D. Pattern with Reduced (1, 1) Coefficients—Example 1

Figure 12:
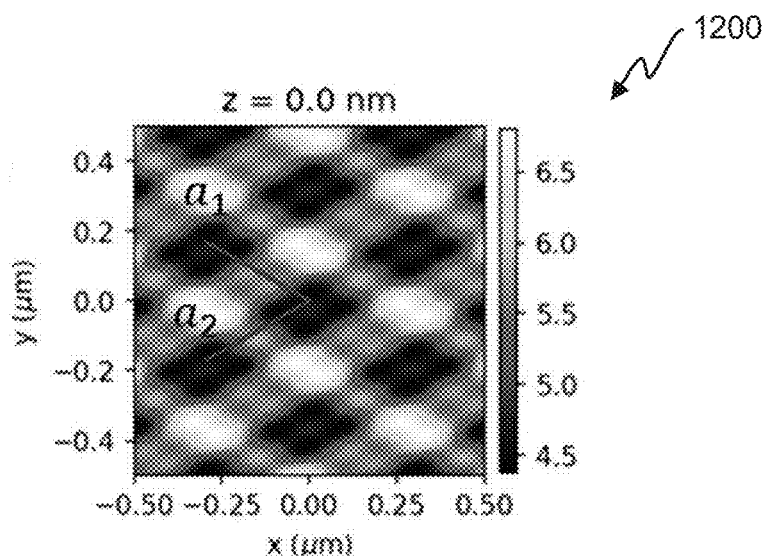
FIG. 12 is an embodiment of a two-dimensional pattern for a grating, wherein the two-dimensional pattern is corrected to suppress the (1, 1) diffraction order.

FIG. 12 is an embodiment of a two-dimensional pattern 1200 for a grating. The two-dimensional pattern 1200 is corrected to suppress first order diffraction. The two-dimensional pattern 1200 is of an x/y plane permittivity distribution. The x/y plane permittivity distribution can be regarded as the sum of two 1D grating permittivity distributions, and thus contains only (m, 0) and (0, n) Fourier orders, and no (1, 1) Fourier order. In this embodiment, a thickness of the device layer is 180 nm, and the index of the substrate is 2.6. A first width, $a_1$, of the design along a first dimension is 340 nm, and a second width, $a_2$, of the design along a second dimension is 240 nm. An angle of the first dimension is 150 degrees, and an angle of the second dimension is −150 degrees (measured from the x axis). In FIG. 12, at least one of two or more materials (or one material) has a varying refractive index (permittivity).

Figure 13:
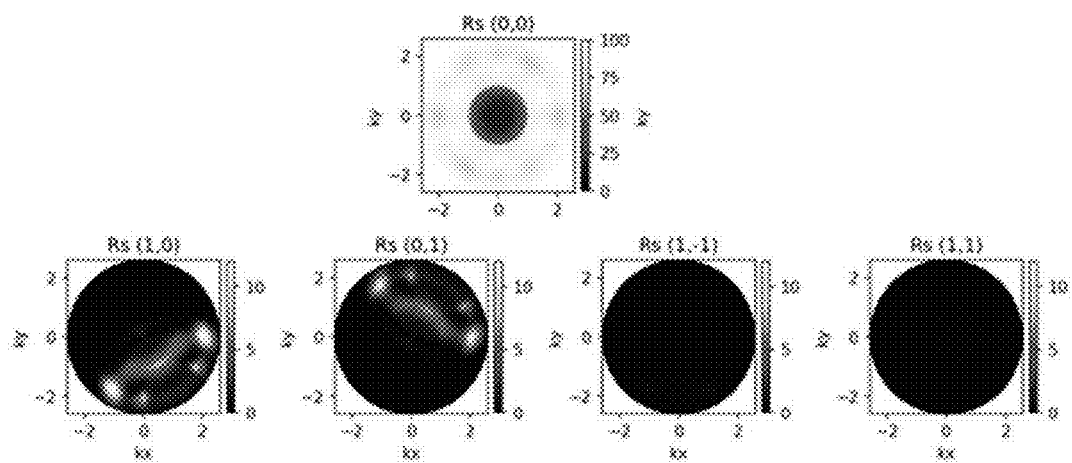
FIG. 13 depicts simulated diffraction plots for the embodiment of the grating in FIG. 12.

FIG. 13 depicts simulated diffraction plots for the embodiment of a grating made of the two-dimensional pattern 1200 in FIG. 12. Plots show that diffraction efficiency of (1, 1) and (−1, −1) orders are suppressed, compared to orders (1, 0) and (0, 1).

Figure 14:
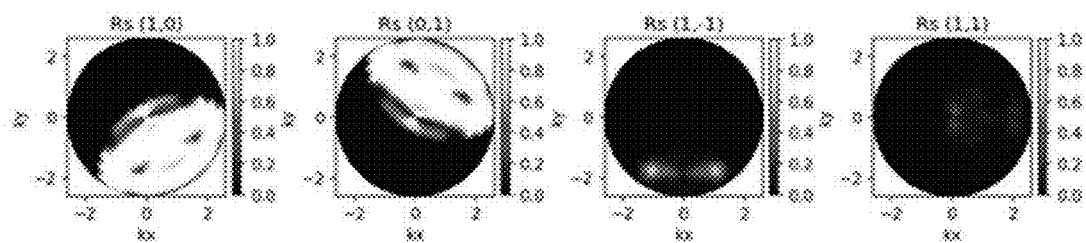
FIG. 14 depicts rescaled simulated diffraction plots for the embodiment of the grating in FIG. 12.

FIG. 14 depicts rescaled simulated diffraction plots for the embodiment of the grating in FIG. 12. The plots in FIG. 14 have a rescaled color bar. Suppression of the (1, 1) order is less than 1/10, compared to orders (1, 0) and (0, 1).

E. Pattern with Reduced (1, 1) Coefficients—Example 2

Figures 15, 16:
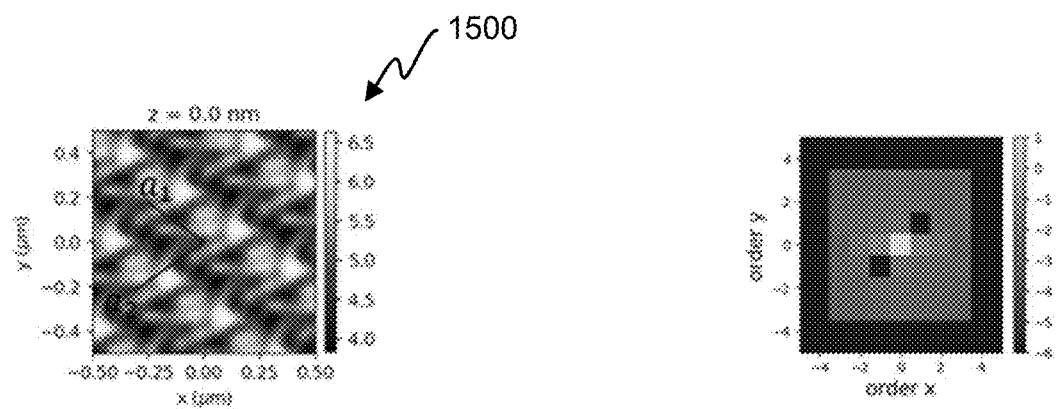
FIG. 15 is another embodiment of a two-dimensional pattern for a grating, wherein the two-dimensional pattern is corrected to suppress the (1, 1) order diffraction.
FIG. 16 depicts a graph of amplitudes of Fourier coefficients.

FIG. 15 is another embodiment of a two-dimensional pattern 1500 for a grating, wherein the two-dimensional pattern is corrected to suppress first order diffraction. The two-dimensional pattern 1500 was obtained by randomly assigning Fourier coefficients of the permittivity distribution between order −3 and 3, and leaving (1, 1) order being zero.

In this embodiment, a first width, $a1$, of the design along a first dimension is 300 nm, and a second width, $a2$, of the design along a second dimension is 380 nm. An angle of the first dimension is 145 degrees, and an angle of the second dimension is −145 degrees (measured from the x axis). In FIG. 15, at least one of two or more materials (or one material) has a varying refractive index (permittivity).

FIG. 16 depicts a graph of amplitudes of Fourier coefficients. FIG. 16 shows log amplitudes of Fourier coefficients of the pattern in FIG. 15. The c(1, 1), and the c(−1, −1) are suppressed compared to the other orders, including orders higher than the (1, 1) order. For example, the c(2, 2) is much greater than (e.g., more than 2 or 3 times) the c(1, 1). In some embodiments, the c(1, 1) is less than half the c(0, 0), c(1, 0), c(0, 1), c(1, 2), c(2, 1), c(2, 2), c(1, 3), c(2, 3), and c(3, 3).

Figure 17:
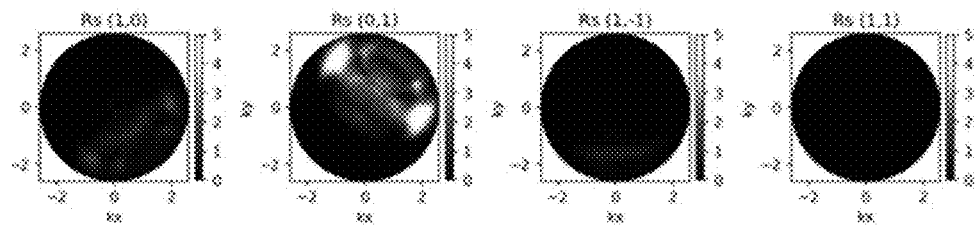
FIG. 17 depicts rescaled simulated diffraction plots for the embodiment of the grating in FIG. 15.
Figure 18:
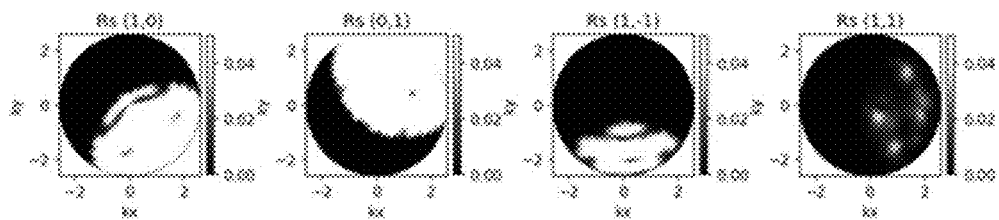
FIG. 18 depicts rescaled simulated diffraction plots for the embodiment of the grating in FIG. 15.

FIG. 17 depicts simulated diffraction plots for the embodiment of a grating made of the two-dimensional pattern 1500 in FIG. 15. Plots show that diffraction efficiency of (1, 1) and (−1, −1) orders are suppressed, compared to orders (1, 0) and (0, 1). FIG. 18 depicts rescaled simulated diffraction plots for the embodiment for the two-dimensional pattern 1500 in FIG. 15.

F. Pattern with Binary Permittivity Values—Example 3

The patterns in examples 1 and 2 above each had at least one material with a varying refractive index. Example 3 is an example of a binary pattern, meaning that there are only two values of refractive index (permittivity). In some embodiments, the two values of refractive index are from two different materials. In some embodiments the two values of refractive index are from the same material, just modified differently (e.g., doped different or exposed differently to change the refractive index). Thus in some embodiments, the device layer is made of just one material. Using a binary permittivity distribution can be more efficiently manufactured, in some embodiments.

Figure 19:
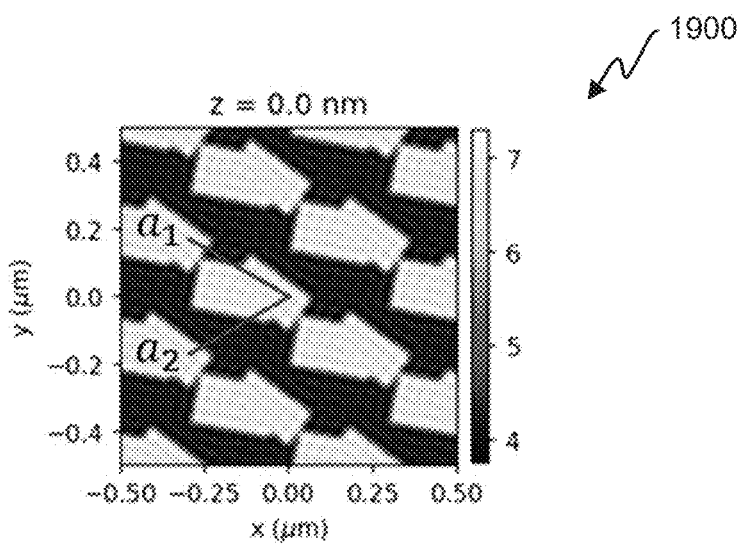
FIG. 19 is an embodiment of a two-dimensional pattern for a grating, wherein the two-dimensional pattern a binary pattern.

FIG. 19 is an embodiment of a two-dimensional pattern 1900 for a grating, wherein the two-dimensional pattern a binary pattern. The two-dimensional pattern 1900 has been designed to minimize the (1, 1) order Fourier coefficient of the permittivity distribution is minimized. The design is nonsymmetrical. In some embodiments, the design is nonsymmetrical to more easily form a binary permittivity distribution with reduced (1, 1) coefficient.

In this embodiment, a first width, a1, of the design along a first dimension is 340 nm, and a second width, a2, of the design along a second dimension is 340 nm. An angle of the first dimension is 150 degrees, and an angle of the second dimension is −150 degrees (measured from the x axis).

Figure 20:
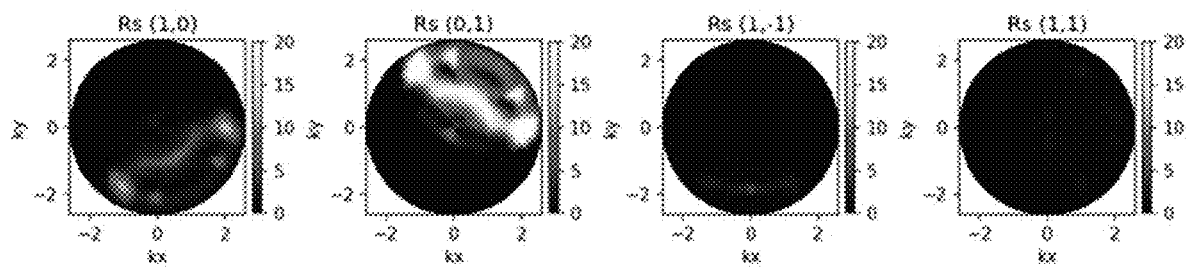
FIG. 20 depicts simulated diffraction plots for the embodiment of the grating in FIG. 19.
Figure 21:
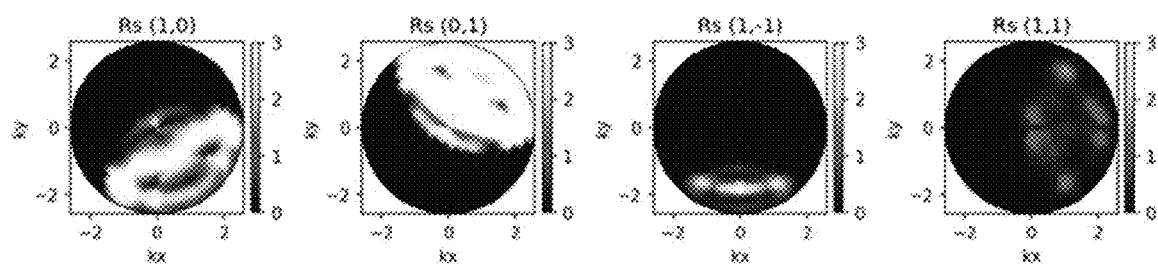
FIG. 21 depicts rescaled simulated diffraction plots for the embodiment of the grating in FIG. 19.

FIG. 20 depicts simulated diffraction plots for the embodiment of a grating made of the two-dimensional pattern 1900 in FIG. 19. Plots show that diffraction efficiency of (1, 1) and (−1, −1) orders are suppressed, compared to orders (1, 0) and (0, 1). FIG. 21 depicts rescaled simulated diffraction plots for the embodiment for the two-dimensional pattern 1900 in FIG. 19.

G. Optimization

A periodic, two-dimensional permittivity pattern can be optimized to suppress a specified coefficient in various ways. In some embodiments, a loss function is minimized. For example, the following function is minimized: $0.5*(f(0, 0)-5.48)^2+4*f(-1, 0)+crown(f(1, 0)/0.1)+crown(f(0, 1)/0.1)+crown(f(1, 1)/0.1)$, where $f(m, n)$ are corresponding Fourier coefficients of permittivity distribution, $crown(x)$ is a monotonic smooth function, which is close to 1 when $x<1$ and close to 0 when $x>1$.

Figure 22:
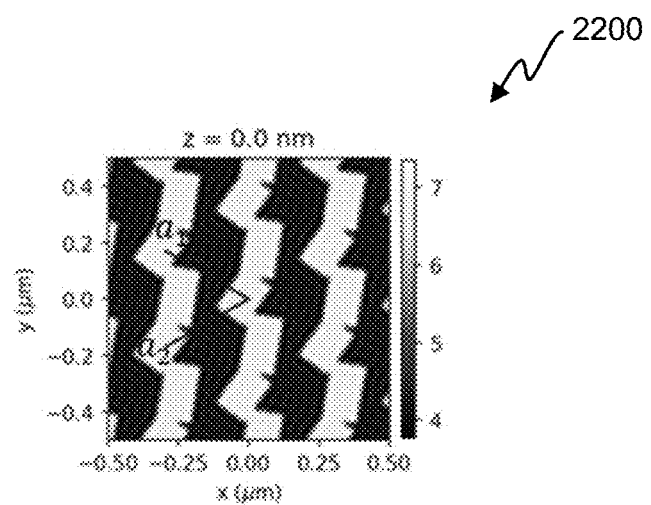
FIG. 22 is an embodiment of an initial permittivity distribution.

FIG. 22 is an embodiment of an initial permittivity distribution 2200. The initial permittivity distribution 2200 is characterized by two overlapping rectangles. Other shapes or initial distributions could be used. The initial permittivity distribution 2200 is optimized to form the two-dimensional pattern in FIG. 26.

Figure 23:
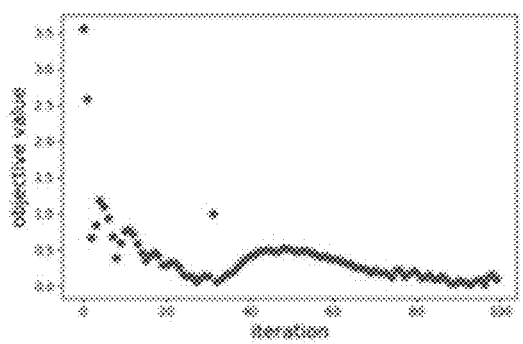
FIG. 23 is a graph of optimizing Fourier coefficients.

FIG. 23 is a graph of optimizing Fourier coefficients. Fourier coefficients of the initial permittivity distribution 2200 are optimized by varying geometric parameters to minimize the (1, 1) order.

Figure 24:
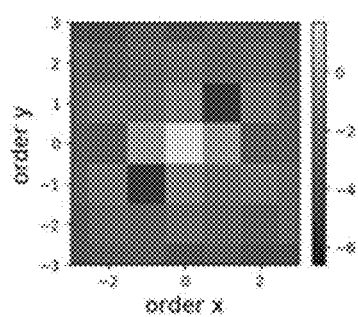
FIG. 24 depicts a graph of amplitudes of Fourier coefficients for the two-dimensional pattern.

FIG. 24 depicts a graph of amplitudes of Fourier coefficients for a two-dimensional pattern obtained after optimization. The graphs shows that the (1, 1) order is suppressed.

H. Suppressed (1, 1) Order Using a Multilayer Structure—Example 4

Figures 25, 26:
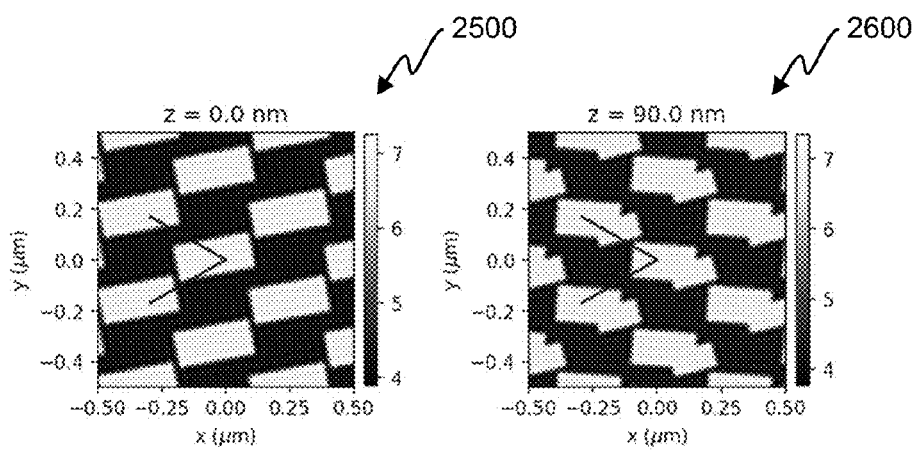
FIG. 25 is an embodiment of a two-dimensional pattern for a first layer of a grating.
FIG. 26 is an embodiment of a two-dimensional pattern for a second layer of a grating.

In some embodiments, the device layer is subdivided into two or more layers. FIG. 25 is an embodiment of a first two-dimensional pattern 2500 for a first layer of a grating. FIG. 26 is an embodiment of a second two-dimensional pattern 2600 for a second layer of the grating. The second layer is stacked on (e.g., adjacent to) the first layer to form a multilayer structure. Each layer of the multilayer structure has a permittivity distribution designed to suppress the (1, 1) Fourier coefficients (e.g., by at least ½, ⅓, ⅕, or ¹/₁₀). A first two-dimensional Fourier series is used to approximate the first two-dimensional pattern 2500. A second two-dimensional Fourier series is used to approximate the second two-dimensional pattern 2600.

In both FIGS. 25 and 26, a first width, a1, of the design along a first dimension is 340 nm, and a second width, a2, of the design along a second dimension is 340 nm. An angle of the first dimension is 150 degrees, and an angle of the second dimension is −150 degrees (measured from the x axis). The thickness (in the z direction) of the first layer is 90 nm and the thickness of the second layer in 90 nm. A combined thickness of the first layer, the second layer, and/or additional layers is equal to or less than 150, 180, 200, or 300 nm.

Figure 27:
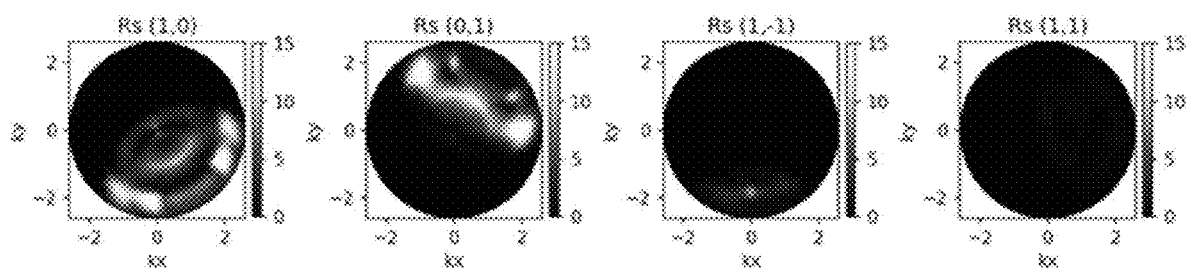
FIG. 27 depicts simulated diffraction plots for an embodiment of a multi-layer grating.
Figure 28:
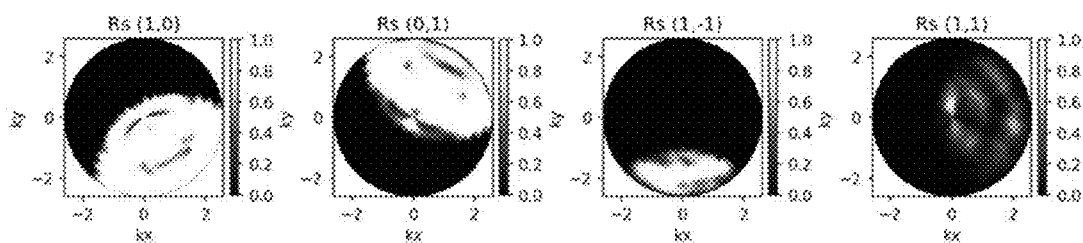
FIG. 28 depicts rescaled simulated diffraction plots for the embodiment of the multi-layer grating.

FIG. 27 depicts simulated diffraction plots for an embodiment of the multilayer structure. The (1, 1) diffraction order is much smaller than other orders. FIG. 28 depicts rescaled simulated diffraction plots for the embodiment of the multilayer structure.

Figure 29:
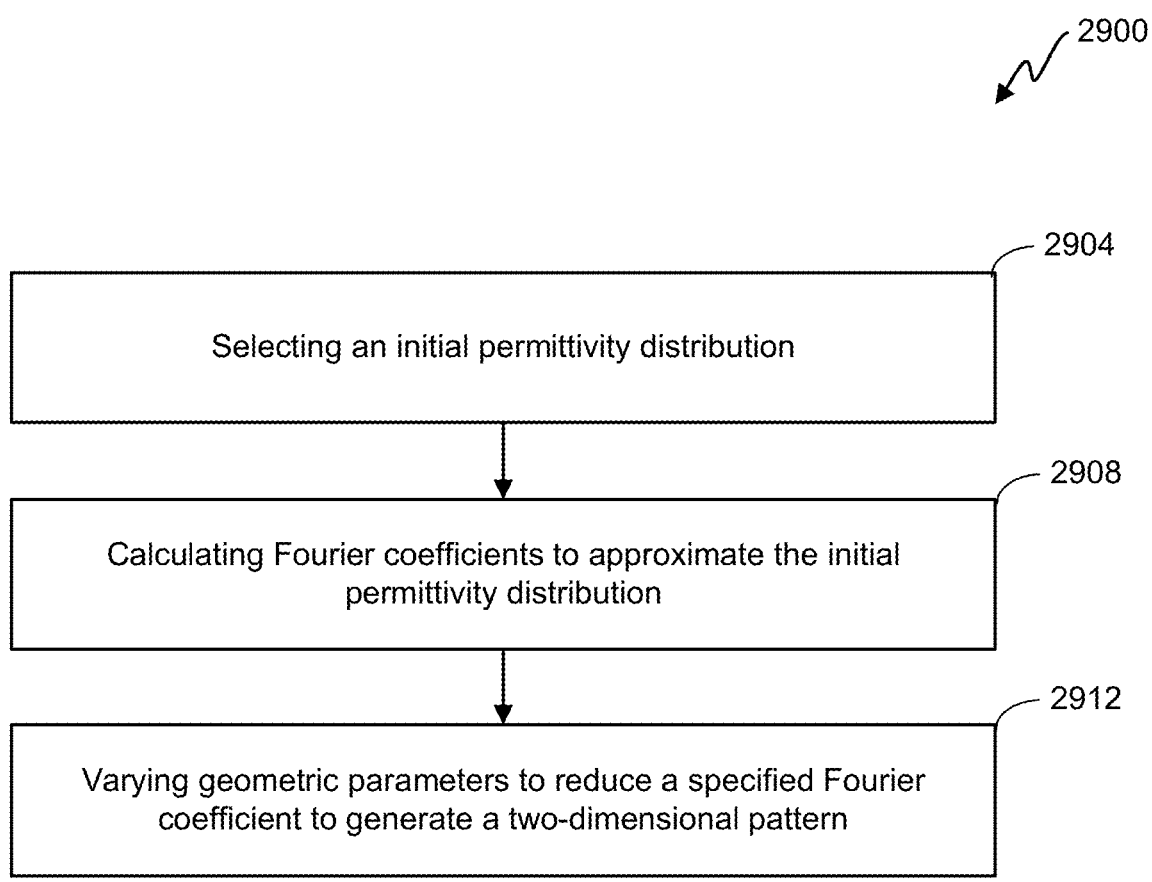
FIG. 29 illustrates an embodiment of a flowchart of a process for forming a pattern in a two-dimensional grating.

FIG. 29 illustrates an embodiment of a flowchart of a process 2900 for forming a pattern in a two-dimensional grating. Process 2900 begins in step 2904 with selecting an initial permittivity distribution (e.g., an initial permittivity distribution 2200 of FIG. 22). The initial permittivity distribution comprises a design of two or more refractive index values repeated periodically in two dimensions.

In step 2908, Fourier coefficients are calculated to approximate the initial permittivity distribution. In step 2912, geometric parameters of the permittivity distribution are varied to reduce a specified Fourier coefficient to generate a two-dimensional pattern. The two-dimensional pattern is generated based on optimizing the Fourier coefficients. The two-dimensional pattern is formed in a device layer of a wafer to form a grating.

In some configurations, the specified Fourier coefficient corresponds with the (1, 1) order of the grating; the specified Fourier coefficient is less than half a coefficient corresponding to a (0, 1) order; the two or more refractive index values are binary values (e.g., as shown in FIGS. 19, 25, and 26); and/or the design is formed in a layer having a thickness equal to or less than 300 nm.

I. Example Electronic System

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or other hardware platform capable of providing artificial reality content to one or more viewers.

Figure 30:
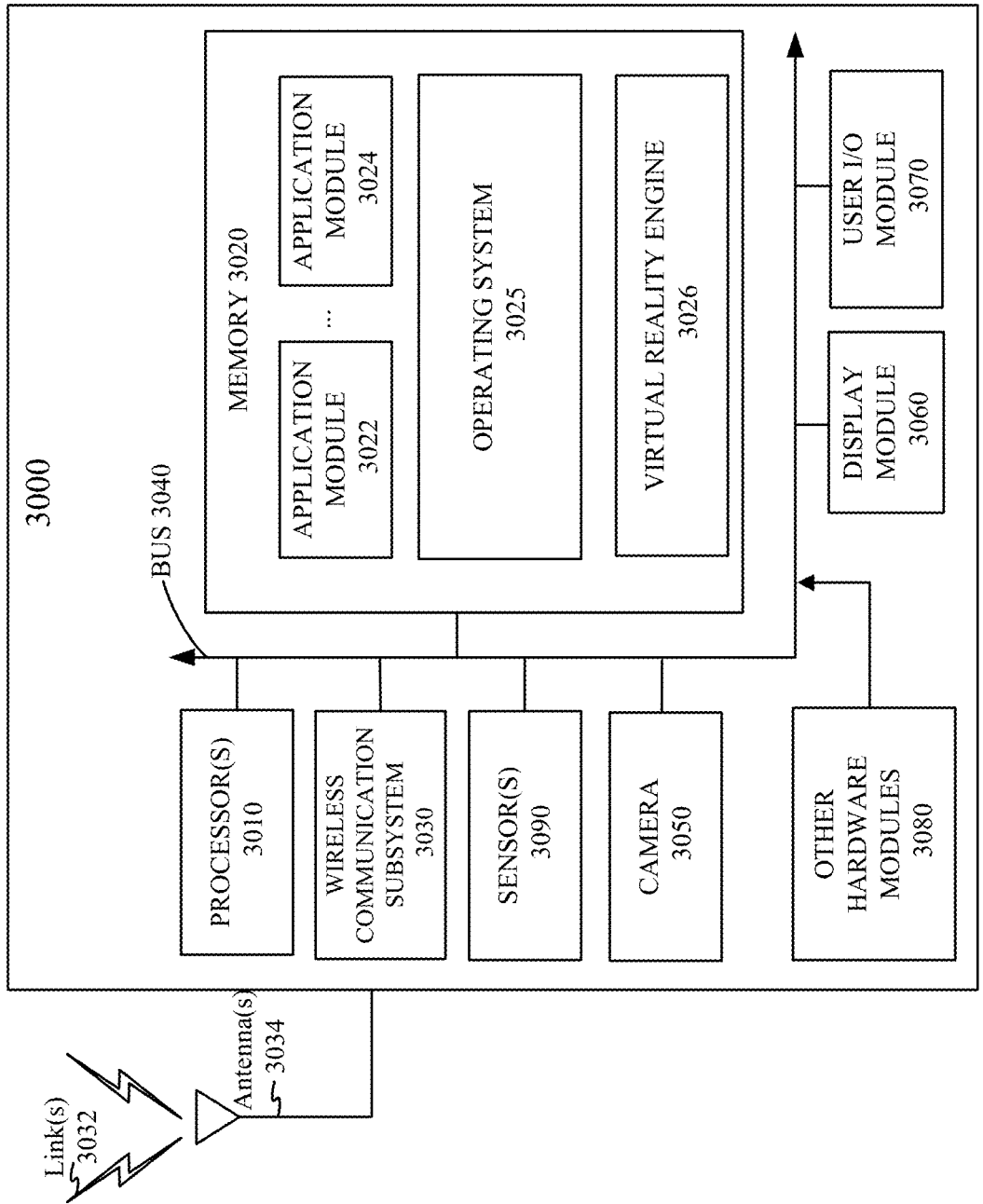
FIG. 30 is a simplified block diagram of an example of an electronic system of a near-eye display system (e.g., HMD device) for implementing some of the examples disclosed herein, according to certain embodiments.

FIG. 30 is a simplified block diagram of an example of an electronic system 3000 of a near-eye display system (e.g., HMD device) for implementing some of the examples disclosed herein. Electronic system 3000 may be used as the electronic system of an HMD device or other near-eye displays described above. In this example, electronic system 3000 may include one or more processor(s) 3010 and a memory 3020. Processor(s) 3010 may be configured to execute instructions for performing operations at a number of components, and can be, for example, a general-purpose processor or microprocessor suitable for implementation within a portable electronic device. Processor(s) 3010 may be communicatively coupled with a plurality of components within electronic system 3000. To realize this communicative coupling, processor(s) 3010 may communicate with the other illustrated components across a bus 3040. Bus 3040 may be a subsystem adapted to transfer data within electronic system 3000. Bus 3040 may include a plurality of computer buses and additional circuitry to transfer data.

Memory 3020 may be coupled to processor(s) 3010. In some embodiments, memory 3020 may offer both short-term and long-term storage and may be divided into several units. Memory 3020 may be volatile, such as static random access memory (SRAM) and/or dynamic random access memory (DRAM) and/or non-volatile, such as read-only memory (ROM), flash memory, and the like. Furthermore, memory 3020 may include removable storage devices, such as secure digital (SD) cards. Memory 3020 may provide storage of computer-readable instructions, data structures, program modules, and other data for electronic system 3000. In some embodiments, memory 3020 may be distributed into different hardware modules. A set of instructions and/or code might be stored on memory 3020. The instructions might take the form of executable code that may be executable by electronic system 3000, and/or might take the form of source and/or installable code, which, upon compilation and/or installation on electronic system 3000 (e.g., using a variety of generally available compilers, installation programs, compression/decompression utilities, etc.), may take the form of executable code.

In some embodiments, memory 3020 may store a plurality of application modules 3022 through 3024, which may include a number of applications. Examples of applications may include gaming applications, conferencing applications, video playback applications, or other suitable applications. The applications may include a depth sensing function or eye tracking function. Application modules 3022-3024 may include particular instructions to be executed by processor(s) 3010. In some embodiments, certain applications or parts of application modules 3022-3024 may be executable by other hardware modules 3080. In certain embodiments, memory 3020 may additionally include secure memory, which may include additional security controls to prevent copying or other unauthorized access to secure information.

In some embodiments, memory 3020 may include an operating system 3025 loaded therein. Operating system 3025 may be operable to initiate the execution of the instructions provided by application modules 3022-3024 and/or manage other hardware modules 3080 as well as interfaces with a wireless communication subsystem 3030 which may include one or more wireless transceivers. Operating system 3025 may be adapted to perform other operations across the components of electronic system 3000 including threading, resource management, data storage control and other similar functionality.

Wireless communication subsystem 3030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 3000 may include one or more antennas 3034 for wireless communication as part of wireless communication subsystem 3030 or as a separate component coupled to a portion of the system. Depending on desired functionality, wireless communication subsystem 3030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for a combination of WWAN, WLAN, and/or WPAN.

Wireless communications subsystem 3030 may permit data to be exchanged with a network, other computer systems, and/or other devices described herein. Wireless communication subsystem 3030 may include a means for transmitting or receiving data, such as identifiers of HMD devices, position data, a geographic map, a heat map, photos, or videos, using antenna(s) 3034 and wireless link(s) 3032. Wireless communication subsystem 3030, processor(s) 3010, and memory 3020 may together comprise at least a part of one or more of a means for performing some functions disclosed herein.

Embodiments of electronic system 3000 may also include one or more sensors 3090. Sensor(s) 3090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or other similar module operable to provide sensory output and/or receive sensory input, such as a depth sensor or a position sensor. For example, in some implementations, sensor(s) 3090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 3000 may include a display module 3060. Display module 3060 may be a near-eye display, and may graphically present information, such as images, videos, and various instructions, from electronic system 3000 to a user. Such information may be derived from one or more application modules 3022-3024, virtual reality engine 3026, one or more other hardware modules 3080, a combination thereof, or other suitable means for resolving graphical content for the user (e.g., by operating system 3025). Display module 3060 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 3000 may include a user input/output module 3070. User input/output module 3070 may allow a user to send action requests to electronic system 3000. An action request may be a request to perform a particular action. For example, an action request may be to start or end an application or to perform a particular action within the application. User input/output module 3070 may include one or more input devices. Example input devices may include a touchscreen, a touch pad, microphone(s), button(s), dial(s), switch(es), a keyboard, a mouse, a game controller, or other suitable device for receiving action requests and communicating the received action requests to electronic system 3000. In some embodiments, user input/output module 3070 may provide haptic feedback to the user in accordance with instructions received from electronic system 3000. For example, the haptic feedback may be provided when an action request is received or has been performed.

Electronic system 3000 may include a camera 3050 that may be used to take photos or videos of a user, for example, for tracking the user's eye position. Camera 3050 may also be used to take photos or videos of the environment, for example, for VR, AR, or MR applications. Camera 3050 may include, for example, a complementary metal-oxide-semiconductor (CMOS) image sensor with a few millions or tens of millions of pixels. In some implementations, camera 3050 may include two or more cameras that may be used to capture 3-D images.

In some embodiments, electronic system 3000 may include a plurality of other hardware modules 3080. Each of other hardware modules 3080 may be a physical module within electronic system 3000. While each of other hardware modules 3080 may be permanently configured as a structure, some of other hardware modules 3080 may be temporarily configured to perform specific functions or temporarily activated. Examples of other hardware modules 3080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 3080 may be implemented in software.

In some embodiments, memory 3020 of electronic system 3000 may also store a virtual reality engine 3026. Virtual reality engine 3026 may execute applications within electronic system 3000 and receive position information, acceleration information, velocity information, predicted future positions, or some combination thereof of the HMD device from the various sensors. In some embodiments, the information received by virtual reality engine 3026 may be used for producing a signal (e.g., display instructions) to display module 3060. For example, if the received information indicates that the user has looked to the left, virtual reality engine 3026 may generate content for the HMD device that mirrors the user's movement in a virtual environment. Additionally, virtual reality engine 3026 may perform an action within an application in response to an action request received from user input/output module 3070 and provide feedback to the user. The provided feedback may be visual, audible, or haptic feedback. In some implementations, processor(s) 3010 may include one or more GPUs that may execute virtual reality engine 3026.

In various implementations, the above-described hardware and modules may be implemented on a single device or on multiple devices that can communicate with one another using wired or wireless connections. For example, in some implementations, some components or modules, such as GPUs, virtual reality engine 3026, and applications (e.g., tracking application), may be implemented on a console separate from the head-mounted display device. In some implementations, one console may be connected to or support more than one HMD.

In alternative configurations, different and/or additional components may be included in electronic system 3000. Similarly, functionality of one or more of the components can be distributed among the components in a manner different from the manner described above. For example, in some embodiments, electronic system 3000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to a storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, other physical medium with patterns of holes, a RAM, a programmable read-only memory (PROM), an erasable programmable read-only memory (EPROM), a FLASH-EPROM, other memory chip or cartridge, a carrier wave as described hereinafter, or other medium from which a computer can read instructions and/or code. A computer program product may include code and/or machine-executable instructions that may represent a procedure, a function, a subprogram, a program, a routine, an application (App), a subroutine, a module, a software package, a class, or combination of instructions, data structures, or program statements.

Those of skill in the art will appreciate that information and signals used to communicate the messages described herein may be represented using a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe a feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean a combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing some or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or type of media suitable for storing electronic instructions, which may be coupled to a computer system bus. Furthermore, computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include an embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by the claims that issue on an application based hereon. Accordingly, the disclosure of the embodiments is intended to be illustrative, but not limiting, of the scope of the disclosure, which is set forth in the following claims.

What is claimed is:

1. A system used in a head-mounted display, the system comprising:
a projector, configured to emit light;
a waveguide configured to guide light received from the projector;
a grating configured to couple light out of the waveguide, wherein:
the grating comprises a design of two or more materials having different refractive indices;
the design is repeated periodically in a first dimension and repeated periodically in a second dimension to form a two-dimensional pattern;
a refractive index of the two-dimensional pattern is approximated by a two-dimensional Fourier series comprising a first coefficient of order (1, 0), a second coefficient of order (0, 1), and a third coefficient of order (1, 1); and
the third coefficient is less than half the first coefficient and less than half the second coefficient, such that light from the (1, 1) diffraction order of the grating is suppressed.

2. The system of claim 1, wherein the third coefficient is less than one-fifth the first coefficient and less than one-fifth the second coefficient.

3. The system of claim 1, wherein the design is spatially nonsymmetrical.

4. The system of claim 1, wherein the two or more materials have a permittivity ranging from 4 to 7.

5. The system of claim 1, wherein the design is formed in a layer having a thickness equal to or less than 300 nm.

6. The system of claim 1, wherein:
the grating comprises a substrate and a device layer; and
the two-dimensional pattern is formed in the device layer.

7. The system of claim 1, wherein different refractive indices of the two or more materials are a binary difference.

8. The system of claim 1, wherein at least one of the two or more materials has a varying refractive index.

9. The system of claim 1, wherein:
the two-dimensional Fourier series comprises a fourth coefficient of order (2, 1); and
the third coefficient is less than half fourth coefficient.

10. The system of claim 1, wherein:
the two-dimensional pattern is a first two-dimensional pattern;
the two-dimensional Fourier series is a first two-dimensional Fourier series;
the first two-dimensional pattern is formed in a first layer;
the grating comprises a second two-dimensional pattern formed in a second layer;
the second two-dimensional pattern is approximated by a second two-dimensional Fourier series; and
a coefficient of the second two-dimensional Fourier series corresponding to a (1, 1) diffraction order is less than half a coefficient of the second two-dimensional Fourier series corresponding to a (1, 0) diffraction order and less than half a coefficient of the second two-dimensional Fourier Series corresponding to a (0, 1) diffraction order.

11. The system of claim 10, wherein:
the first layer is adjacent to the second layer; and
a combined thickness of the first layer and the second layer is equal to or less than 300 nm.

12. A method comprising:
selecting an initial permittivity distribution, wherein the initial permittivity distribution comprises a design of two or more refractive index values repeated periodically in two dimensions;
calculating Fourier coefficients to approximate the initial permittivity distribution;
varying geometric parameters to reduce a specified Fourier coefficient to generate a two-dimensional pattern; and
forming the two-dimensional pattern in a device layer of a wafer to form a grating in the device layer.

13. The method of claim 12, wherein the specified Fourier coefficient corresponds with the (1, 1) order of the grating.

14. The method of claim 13, wherein the specified Fourier coefficient is less than half a coefficient corresponding to a (1, 0) order and less than half a coefficient corresponding to a (0, 1) order.

15. The method of claim 12, wherein the two or more refractive index values are binary values.

16. The method of claim 12, wherein the design is formed in a layer having a thickness equal to or less than 300 nm.

17. A grating comprising:
a substrate; and
a device layer, wherein:
the device layer comprises a design of two or more materials having different refractive indices;
the design is repeated periodically in a first dimension and repeated periodically in a second dimension to form a two-dimensional pattern;
a refractive index of the two-dimensional pattern is approximated by a two-dimensional Fourier series comprising a first coefficient of order (0, 1), a second coefficient of order (1, 1), and a third coefficient of order (2, 1); and
the second coefficient is less than half the first coefficient and less than half the third coefficient.

18. The grating of claim 17, wherein the grating is part of a head-mounted display of an augmented-reality system.

19. The grating of claim 17, wherein the design is formed in a layer having a thickness equal to or less than 300 nm.

20. The grating of claim 17, wherein different refractive indices of the two or more materials are a binary difference.

* * * * *